US012693894B2

(12) United States Patent
Ma et al.

(10) Patent No.: US 12,693,894 B2
(45) Date of Patent: Jul. 28, 2026

(54) SCHEDULING A REQUEST USING AN INFERENCE LARGE SCALE MODEL AND RESCHEDULING ON A DIFFERENT INFERENCE LARGE SCALE MODEL IN RESPONSE TO NOT MEETING A CONDITION

(71) Applicant: Huawei Technologies Co., Ltd., Shenzhen (CN)

(72) Inventors: Yipeng Ma, Beijing (CN); Tao Wang, Beijing (CN); Yong Peng, Dongguan (CN); Jianhui Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/274,090

(22) Filed: Jul. 18, 2025

(65) Prior Publication Data

US 2025/0348352 A1     Nov. 13, 2025

Related U.S. Application Data

(63) Continuation of application No. 19/022,596, filed on Jan. 15, 2025, which is a continuation of application No. PCT/CN2024/096924, filed on Jun. 3, 2024.

(30) Foreign Application Priority Data

Oct. 24, 2023     (CN) .......................... 202311386911.8

(51) Int. Cl.
 *G06F 9/48* (2006.01)
 *G06F 9/54* (2006.01)
(52) U.S. Cl.
 CPC .............. *G06F 9/4881* (2013.01); *G06F 9/54* (2013.01)

(58) Field of Classification Search
 CPC ................................. G06F 9/4881; G06F 9/54
 See application file for complete search history.

(56) References Cited

U.S. PATENT DOCUMENTS 9,152,458 B1 * 10/2015 Hellerstein ......... G06F 11/2035
11,971,799 B2 * 4/2024 Dageville ........... G06F 11/3438
(Continued)

FOREIGN PATENT DOCUMENTS

CN     106487849 A     3/2017
CN     110868477 A     3/2020
(Continued)

OTHER PUBLICATIONS

"Transformer model", Wikipedia, the free encyclopedia, Last modified on Jan. 8, 2025, [online]https://zh.wikipedia.org/wiki/Transformer%E6%A8%A1%E5%9E%8B, total 7 pages.
(Continued)

*Primary Examiner* — Jorge A Chu Joy-Davila
(74) *Attorney, Agent, or Firm* — Slater Matsil, LLP

(57) ABSTRACT

In accordance with an embodiment, a method includes receiving, by a first device, a first request from a first user, where the first request is a request for a first service, and the first request comprises an identifier of the first service; scheduling, by the first device, the first request to a second device; and sending, by the second device, a second request to the first device, wherein the second request comprises the identifier of the first service and first output information corresponding to the first service, and the second request is associated with the first request.

20 Claims, 12 Drawing Sheets

(56)  References Cited

U.S. PATENT DOCUMENTS

| | | | | |
|---|---|---|---|---|
| 2007/0244800 A1* | 10/2007 | Lee | .......................... | G06Q 30/08 |
| | | | | 705/37 |
| 2020/0301759 A1* | 9/2020 | Vaddi | ................... | G06F 11/1433 |
| 2021/0103468 A1* | 4/2021 | Wang | ..................... | G06F 9/5044 |
| 2022/0310080 A1 | 9/2022 | Qiu et al. | | |
| 2023/0207120 A1 | 6/2023 | Wu et al. | | |
| 2023/0244938 A1 | 8/2023 | Wei et al. | | |

FOREIGN PATENT DOCUMENTS

| | | | |
|---|---|---|---|
| CN | 110955501 A | 4/2020 |
| CN | 112712378 A | 4/2021 |
| CN | 112996066 A | 6/2021 |
| CN | 116886726 A | 10/2023 |
| CN | 116909733 A | 10/2023 |
| CN | 117956042 A | 4/2024 |
| RU | 2787009 C2 | 12/2022 |

OTHER PUBLICATIONS

Gyeong-In Yu et al:"Orca: A Distributed Serving System for Transformer-Based Generative Models", 16th USENIX Symposium on Operating Systems Design and Implementation, Jul. 11-13, 2022, total 19 pages.

* cited by examiner

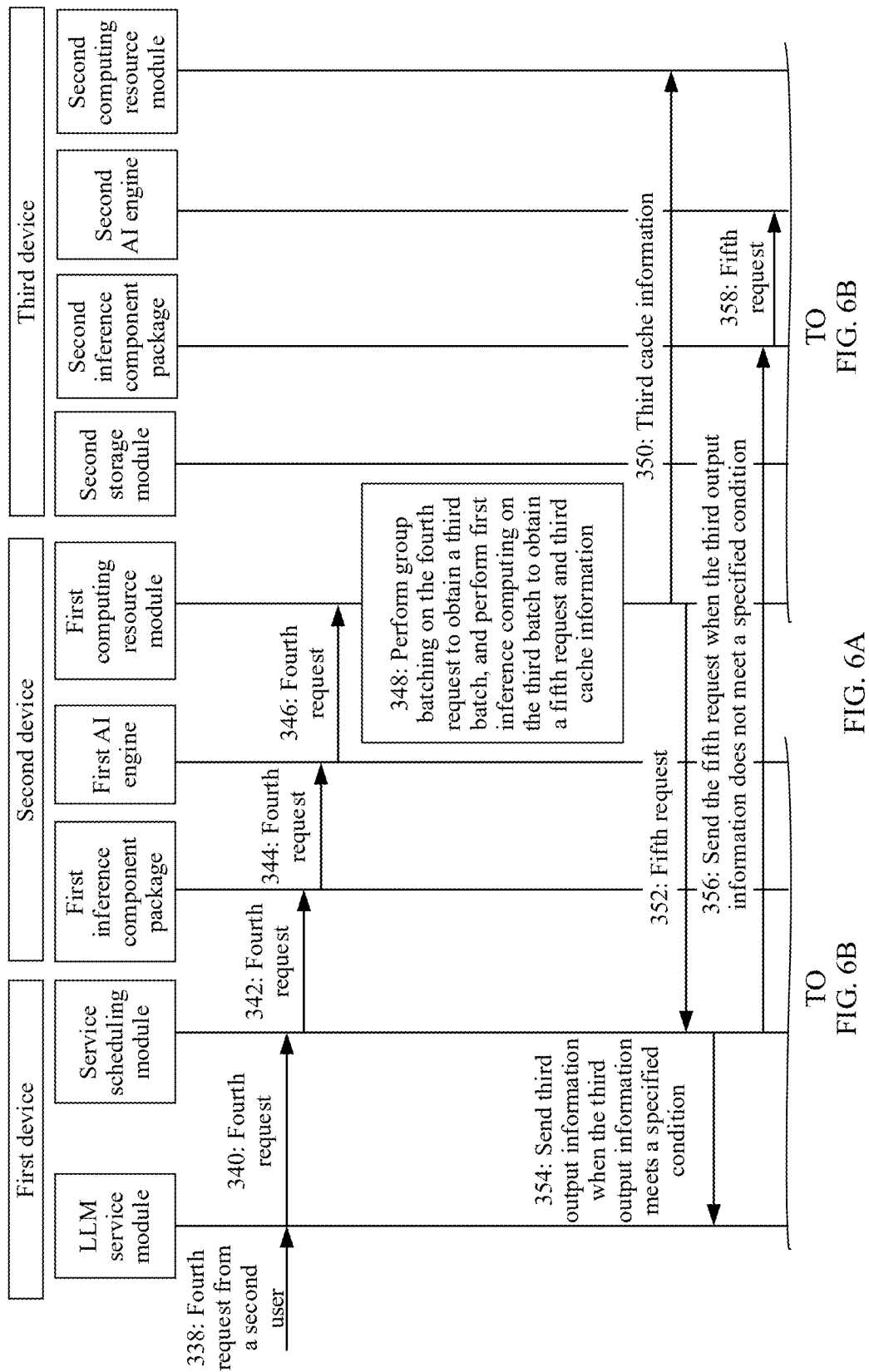

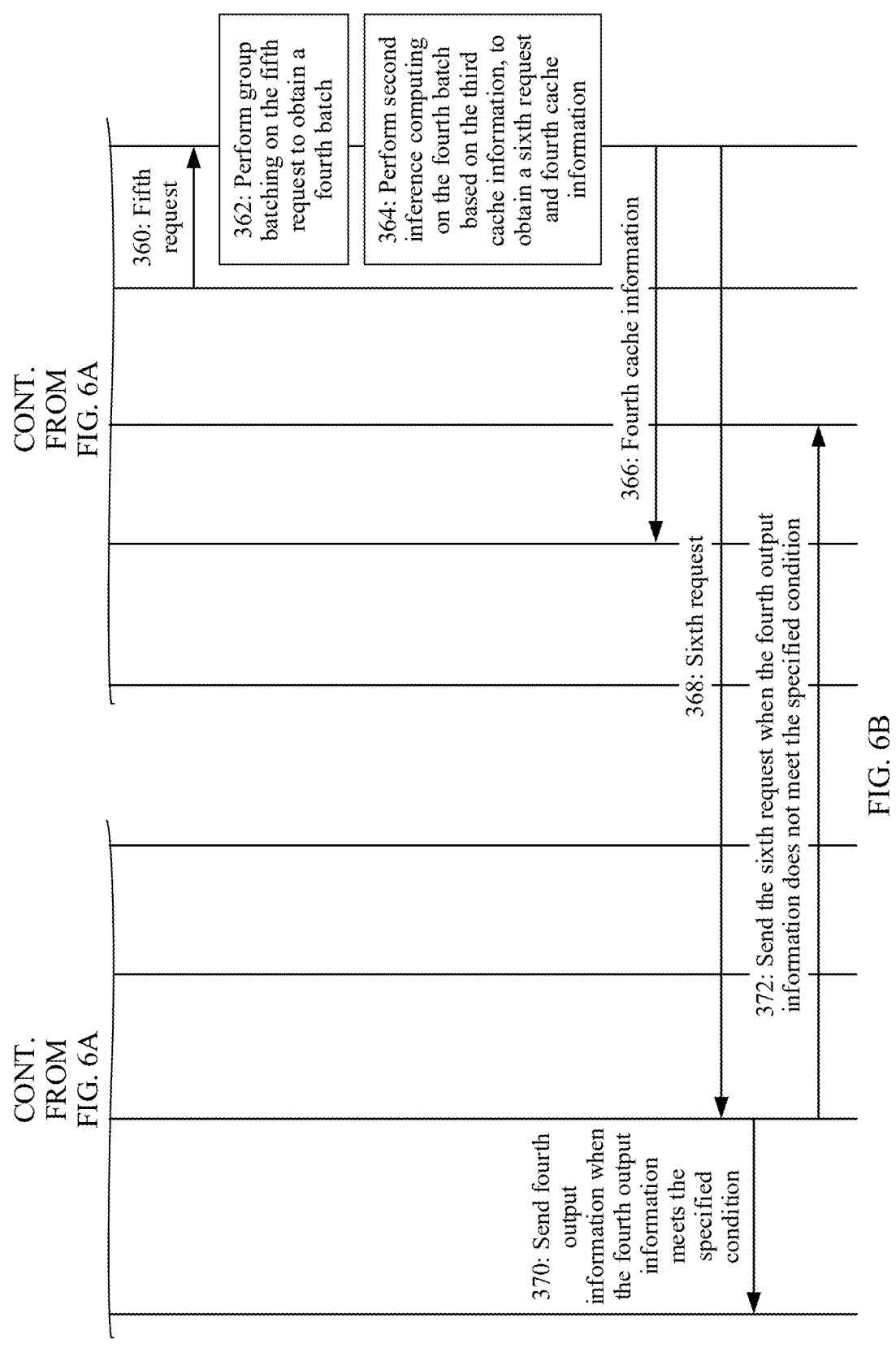

CONT.
FROM
FIG. 6A

360: Fifth request

362: Perform group batching on the fifth request to obtain a fourth batch

364: Perform second inference computing on the fourth batch based on the third cache information, to obtain a sixth request and fourth cache information 366: Fourth cache information 368: Sixth request 372: Send the sixth request when the fourth output information does not meet the specified condition

CONT.
FROM
FIG. 6A

370: Send fourth output information when the fourth output information meets the specified condition

FIG. 6B

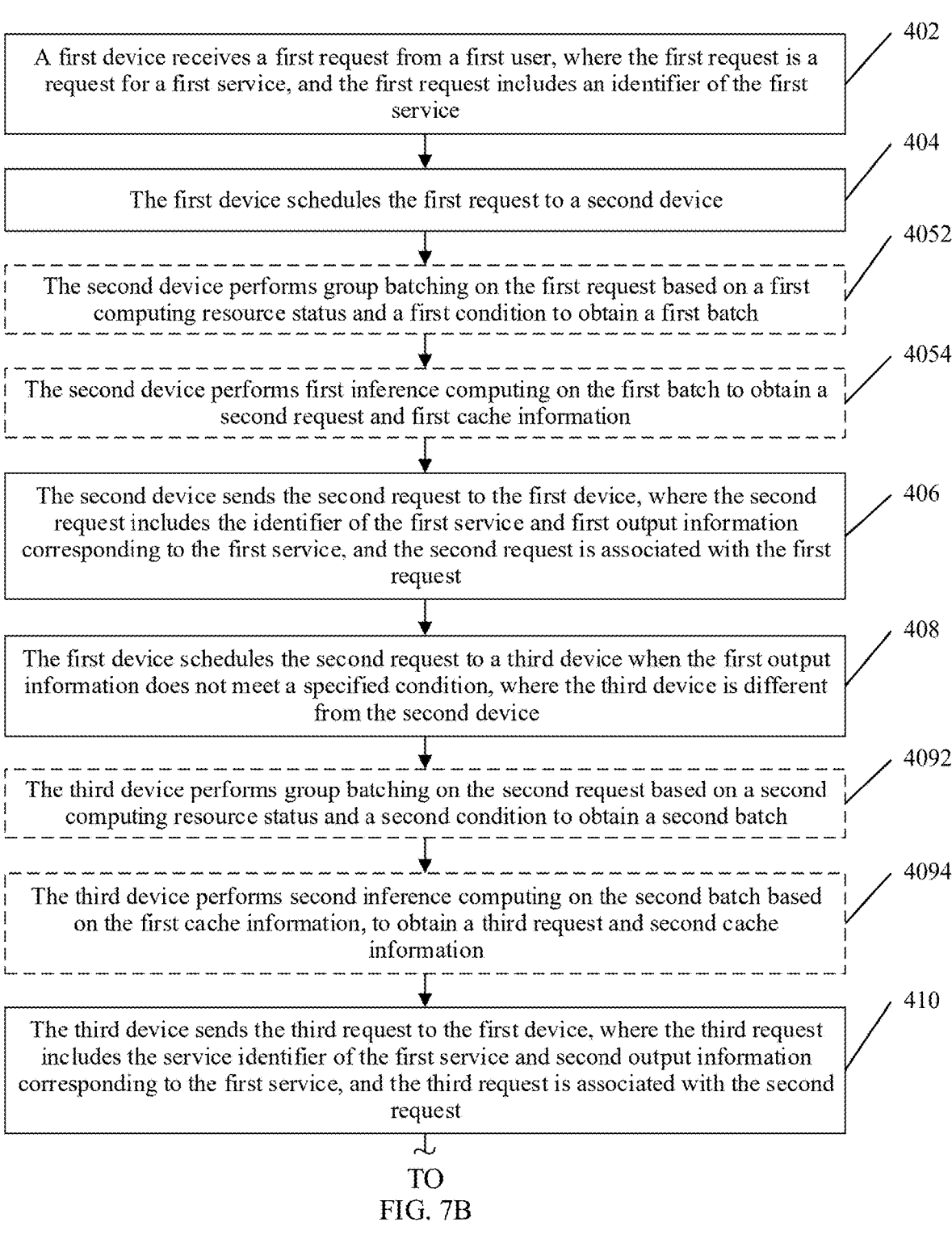

A first device receives a first request from a first user, where the first request is a request for a first service, and the first request includes an identifier of the first service

402

The first device schedules the first request to a second device

404

The second device performs group batching on the first request based on a first computing resource status and a first condition to obtain a first batch

4052

The second device performs first inference computing on the first batch to obtain a second request and first cache information

4054

The second device sends the second request to the first device, where the second request includes the identifier of the first service and first output information corresponding to the first service, and the second request is associated with the first request

406

The first device schedules the second request to a third device when the first output information does not meet a specified condition, where the third device is different from the second device

408

The third device performs group batching on the second request based on a second computing resource status and a second condition to obtain a second batch

4092

The third device performs second inference computing on the second batch based on the first cache information, to obtain a third request and second cache information

4094

The third device sends the third request to the first device, where the third request includes the service identifier of the first service and second output information corresponding to the first service, and the third request is associated with the second request

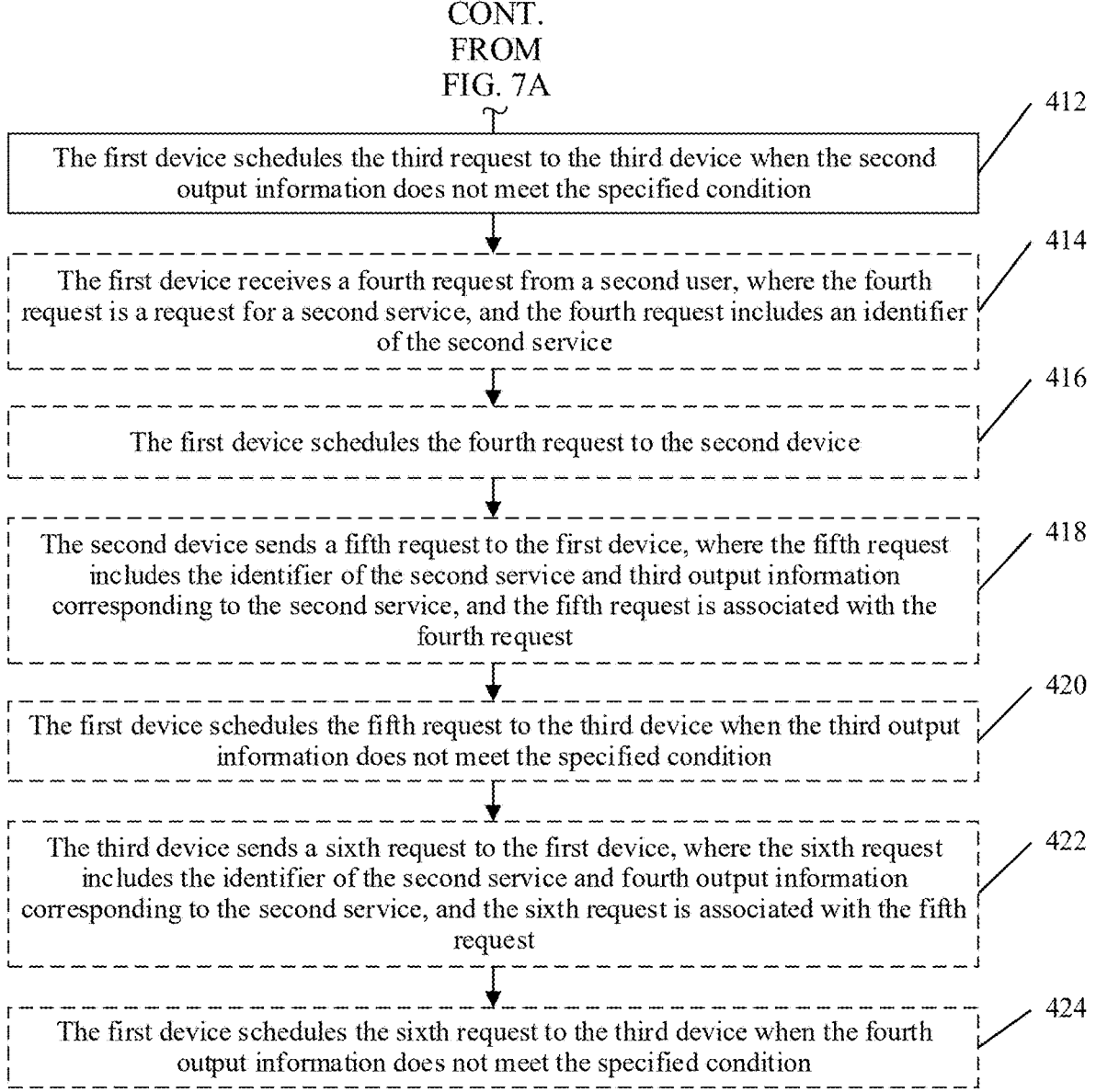

CONT.
FROM
FIG. 7A

The first device schedules the third request to the third device when the second output information does not meet the specified condition — 412

The first device receives a fourth request from a second user, where the fourth request is a request for a second service, and the fourth request includes an identifier of the second service — 414

The first device schedules the fourth request to the second device — 416

The second device sends a fifth request to the first device, where the fifth request includes the identifier of the second service and third output information corresponding to the second service, and the fifth request is associated with the fourth request — 418

The first device schedules the fifth request to the third device when the third output information does not meet the specified condition — 420

The third device sends a sixth request to the first device, where the sixth request includes the identifier of the second service and fourth output information corresponding to the second service, and the sixth request is associated with the fifth request — 422

The first device schedules the sixth request to the third device when the fourth output information does not meet the specified condition — 424

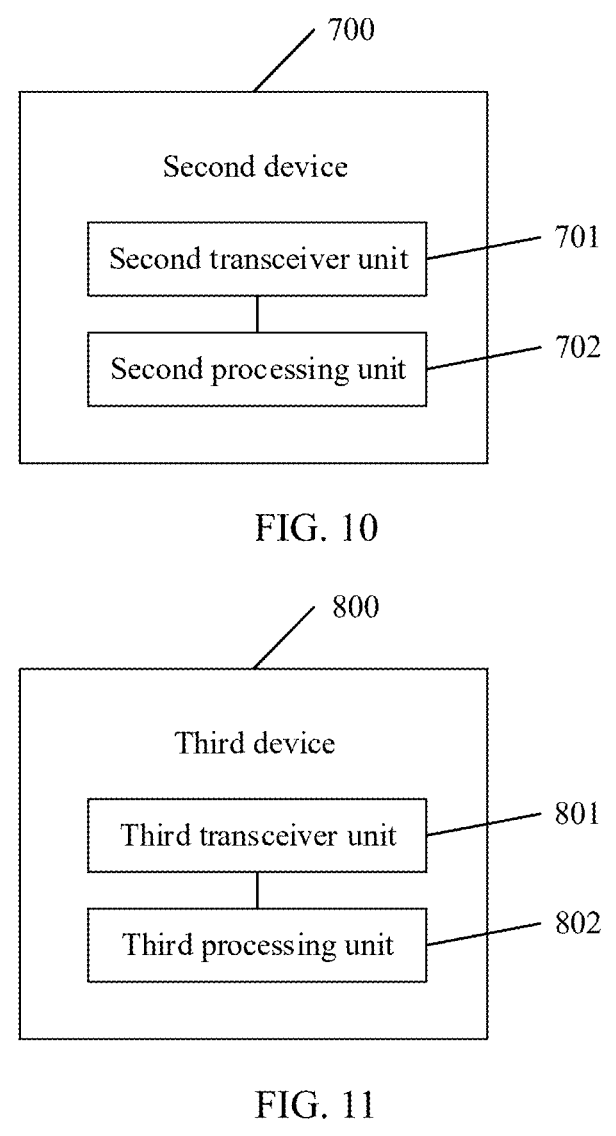

Second device

Second transceiver unit — 701

Second processing unit — 702

Third device

Third transceiver unit — 801

Third processing unit — 802

FIG. 11

SCHEDULING A REQUEST USING AN INFERENCE LARGE SCALE MODEL AND RESCHEDULING ON A DIFFERENT INFERENCE LARGE SCALE MODEL IN RESPONSE TO NOT MEETING A CONDITION

CROSS-REFERENCE TO RELATED APPLICATIONS

This application is a continuation of U.S. patent application Ser. No. 19/022,596, filed Jan. 15, 2025, which application is a continuation of International Application No. PCT/CN2024/096924, filed on Jun. 3, 2024, which claims priority to Chinese Patent Application No. 202311386911.8, filed on Oct. 24, 2023. The disclosures of the aforementioned applications are hereby incorporated by reference in their entireties.

TECHNICAL FIELD

The present invention relates to the field of computer technologies, and in particular, to a request scheduling method and a device.

BACKGROUND

A large language model (LLM) has set off a new wave in the artificial intelligence (AI) field. An inference process of a generative pre-trained transformer (GPT) using a key-value cache (KV Cache) technology includes two phases: a first-round context filling (Prefill) phase and a multi-round decode phase. In a large-scale language model service deployment, although a service system uses a dynamic scheduling manner, a throughput of the service system in the LLM service deployment is still low.

SUMMARY

In view of this, embodiments of the present invention provide a request scheduling method and a device, to improve a throughput of a service system in an LLM service deployment.

According to a first aspect, an embodiment of the present invention provides a request scheduling method, applied to a request scheduling system, where the method includes:

A first device receives a first request from a first user, where the first request is a request for a first service, and the first request includes an identifier of the first service;

the first device schedules the first request to a second device;

the second device sends a second request to the first device, where the second request includes the identifier of the first service and first output information corresponding to the first service, and the second request is associated with the first request;

the first device schedules the second request to a third device when the first output information does not meet a specified condition, where the third device is different from the second device;

the third device sends a third request to the first device, where the third request includes the identifier of the first service and second output information corresponding to the first service, and the third request is associated with the second request; and the first device schedules the third request to the third device when the second output information does not meet the specified condition.

In addition, in this embodiment of the present invention, in the request scheduling system, the second device and the third device are deployed in an independent separate deployment manner. The first device schedules a request, so that the second device and the third device respectively perform inference processes in respective phases. In addition, information may be transferred between the two devices, so that the inference process can be normally performed, and a throughput of a service system can be improved.

With reference to the first aspect, in some implementations of the first aspect, the method further includes:

the first device receives a fourth request from a second user, where the fourth request is a request for a second service, and the fourth request includes an identifier of the second service;

the first device schedules the fourth request to the second device;

the second device sends a fifth request to the first device, where the fifth request includes the identifier of the second service and third output information corresponding to the second service, and the fifth request is associated with the fourth request;

the first device schedules the fifth request to the third device when the third output information does not meet the specified condition;

the third device sends a sixth request to the first device, where the sixth request includes the identifier of the second service and fourth output information corresponding to the second service, and the sixth request is associated with the fifth request; and the first device schedules the sixth request to the third device when the fourth output information does not meet the specified condition.

In this embodiment of the present invention, the second user is different from the first user, and the first device can schedule requests from different users to the second device and the third device for processing, without waiting for the second device and/or the third device to process a request from one user before processing a request from another user. Therefore, a throughput of the service system can be improved.

With reference to the first aspect, in some implementations of the first aspect, the method further includes:

the first device sends the second output information to the first user when the second output information meets the specified condition.

In this embodiment of the present invention, the first device determines whether the output information of the service meets the specified condition. If the specified condition is not met, the first device continues to perform scheduling and inference computing on the service. If the specified condition is met, the first device performs early stopping on the service, and sends the second output information to the first user. After early stopping the service, the first device may indicate the third device to release a resource corresponding to the service. The third device reports a current resource status of the third device to the first device. If there is an idle computing service resource in the current resource status, the first device continues to schedule a service to the third device to insert the idle computing service resource, to implement dynamic insertion.

With reference to the first aspect, in some implementations of the first aspect, the request scheduling system includes the first device, at least one second device, and at least one third device. In this embodiment of the present invention, when there are a large quantity of second devices and third devices in the request scheduling system, the second devices and the third devices are deployed in an independent separate deployment manner. A small batch or a single batch is configured for the second devices, and a large batch is configured for the third devices. A resource proportion of the second device resource to the third device resource may be dynamically adjusted based on system load, to obtain a maximum throughput, and greatly improve the throughput.

According to a second aspect, an embodiment of the present invention provides a request scheduling method, used in a first device, where the method includes:

receiving a first request from a first user, where the first request is a request for a first service, and the first request includes an identifier of the first service;

scheduling the first request to a second device;

receiving a second request sent by the second device, where the second request includes the identifier of the first service and first output information corresponding to the first service, and the second request is associated with the first request;

scheduling the second request to a third device when the first output information does not meet a specified condition, where the third device is different from the second device;

receiving a third request sent by the third device, where the third request includes the identifier of the first service and second output information corresponding to the first service, and the third request is associated with the second request; and scheduling the third request to the third device when the second output information does not meet the specified condition.

In this embodiment of the present invention, a request for a new service from a user is scheduled to the second device, that is, a prefill inference execution container performs inference computing in a prefill phase; and a request for an old service that passes through the prefill phase is scheduled to the third device, that is, a decode inference execution container performs inference computing in a decoding phase. In the present invention, in the separate deployment manner, a significant difference between a computing power bottleneck in the prefill phase and a memory access bottleneck in the decoding phase is comprehensively considered, so that the throughput of the service system can be improved.

With reference to the second aspect, in some implementations of the second aspect, the method further includes:

receiving a fourth request from a second user, where the fourth request is a request for a second service, and the fourth request includes an identifier of the second service; scheduling the fourth request to the second device;

receiving a fifth request sent by the second device, where the fifth request includes the identifier of the second service and third output information corresponding to the second service, and the fifth request is associated with the fourth request;

scheduling the fifth request to the third device when the third output information does not meet the specified condition;

receiving a sixth request sent by the third device, where the sixth request includes the identifier of the second service and fourth output information corresponding to the second service, and the sixth request is associated with the fifth request; and scheduling the sixth request to the third device when the fourth output information does not meet the specified condition.

In this embodiment of the present invention, the second user is different from the first user, and the first device can schedule requests from different users to the second device and the third device for processing, without waiting for the second device and/or the third device to process a request from one user before processing a request from another user. Therefore, a throughput of the service system can be improved.

With reference to the second aspect, in some implementations of the second aspect, the method further includes:

when the second output information meets the specified condition, sending the second output information to the first user.

In this embodiment of the present invention, the first device determines whether the output information of the service meets the specified condition. If the specified condition is not met, the first device continues to perform scheduling and inference computing on the service. If the specified condition is met, the first device performs early stopping on the service, and sends the second output information to the first user. After early stopping the service, the first device may indicate the third device to release a resource corresponding to the service. The third device reports a current resource status of the third device to the first device. If there is an idle computing service resource in the current resource status, the first device continues to schedule a service to the third device to insert the idle computing service resource, to implement dynamic insertion.

With reference to the second aspect, in some implementations of the second aspect, the identifier includes a service ID.

With reference to the second aspect, in some implementations of the second aspect, the specified condition includes at least one of the following:

a length of output information is greater than or equal to a first threshold; or the output information includes a terminator.

According to a third aspect, an embodiment of the present invention provides a request scheduling method, used in a second device, where the method includes:

receiving a first request sent by a first device from a first user, where the first request is a request for a first service, and the first request includes an identifier of the first service; and sending a second request to the first device, where the second request includes the identifier of the first service and first output information corresponding to the first service, and the second request is associated with the first request.

In this embodiment of the present invention, a request for a new service from a user is scheduled to the second device, that is, a prefill inference execution container performs inference computing in a prefill phase; and a request for an old service that passes through the prefill phase is scheduled to the third device, that is, a decode inference execution container performs inference computing in a decoding phase. In the present invention, in the separate deployment manner, a significant difference between a computing power bottleneck in the prefill phase and a memory access bottleneck in the decoding phase is comprehensively considered, so that the throughput of the service system can be improved.

With reference to the third aspect, in some implementations of the third aspect, the method further includes:

receiving a fourth request sent by the first device from a second user, where the fourth request is a request for a second service, and the fourth request includes an identifier of the second service; and sending a fifth request to the first device, where the fifth request includes the identifier of the second service and third output information corresponding to the second service, and the fifth request is associated with the fourth request.

In this embodiment of the present invention, the second user is different from the first user, and the first device can schedule requests from different users to the second device and the third device for processing, without waiting for the second device and/or the third device to process a request from one user before processing a request from another user. Therefore, a throughput of the service system can be improved.

With reference to the third aspect, in some implementations of the third aspect, before the sending a second request to the first device, the method further includes:

performing, based on a first computing resource status and a first condition, group batching on the first request and at least one seventh request that arrives at the second device at the same time as the first request, to obtain a first batch, where the seventh request is a request from the first user, a second user, or another user; and performing first inference computing on the first batch to obtain the second request and first cache information.

With reference to the third aspect, in some implementations of the third aspect, the method further includes:

sending the first cache information to the third device.

With reference to the third aspect, in some implementations of the third aspect, the cache information includes key-value KV cache information.

With reference to the third aspect, in some implementations of the third aspect, the performing, based on a first computing resource status and a first condition, group batching on the first request and at least one seventh request that arrives at the second device at the same time as the first request, to obtain a first batch includes:

obtaining, based on the first request, input information corresponding to the first request and a first length of the input information; and performing group batching on the first request and the at least one seventh request based on the first computing resource status, the first condition, and the first length, to obtain the first batch. A length of the input information corresponding to the seventh request is similar to the first length. This helps reduce a waste of idle resources in a first inference computing process.

With reference to the third aspect, in some implementations of the third aspect, the first computing resource status includes a quantity of idle resources in the second device.

With reference to the third aspect, in some implementations of the third aspect, the first condition includes a maximum quantity of requests grouped by the second device in a batch.

With reference to the third aspect, in some implementations of the third aspect, in the first processing manner, after inference computing of all requests in a current batch ends, computing service resources occupied by the current batch are released, and a next batch is inserted into the idle computing service resources to perform first inference computing.

In this embodiment of the present invention, for inference computing in the prefill phase, inference computing is performed based on a single batch. To be specific, after inference computing of all requests in a current batch ends, computing service resources occupied by the current batch are released, and a next batch is inserted into an idle computing service resource for starting to perform the first inference computing on the next batch.

According to a fourth aspect, an embodiment of the present invention provides a request scheduling method, used in a third device, where the method includes:

receiving a second request sent by a first device from a second device, where the second request includes an identifier of a first service and first output information corresponding to the first service, the second request is associated with the first request, and the first request is a request for the first service from a first user; and sending a third request to the first device, where the third request includes the identifier of the first service and second output information corresponding to the first service, and the third request is associated with the second request.

In this embodiment of the present invention, a request for a new service from a user is scheduled to the second device, that is, a prefill inference execution container performs inference computing in a prefill phase; and a request for an old service that passes through the prefill phase is scheduled to the third device, that is, a decode inference execution container performs inference computing in a decoding phase. In the present invention, in the separate deployment manner, a significant difference between a computing power bottleneck in the prefill phase and a memory access bottleneck in the decoding phase is comprehensively considered, so that the throughput of the service system can be improved.

With reference to the fourth aspect, in some implementations of the fourth aspect, the method further includes:

receiving a fifth request sent by the first device, where the fifth request includes an identifier of a second service and third output information corresponding to the second service, the fifth request is associated with a fourth request, and the fourth request is a request for the second service from a second user; and sending a sixth request to the first device, where the sixth request includes the identifier of the second service and fourth output information corresponding to the second service, and the sixth request is associated with the fifth request.

In this embodiment of the present invention, the second user is different from the first user, and the first device can schedule requests from different users to the second device and the third device for processing, without waiting for the second device and/or the third device to process a request from one user before processing a request from another user. Therefore, a throughput of the service system can be improved.

With reference to the fourth aspect, in some implementations of the fourth aspect, before the sending a third request to the first device, the method further includes:

performing, based on a second computing resource status and a second condition, group batching on the second request and at least one eighth request that arrives at the third device at the same time as the second request, to obtain a second batch, where the eighth request is from the second device or the third device;

receiving first cache information sent by the second device; and performing second inference computing on the second batch based on the first cache information, to obtain the third request and second cache information.

According to a fifth aspect, an embodiment of the present invention provides a request scheduling system, where the system includes:

a first device, configured to receive a first request from a first user, where the first request is a request for a first service, and the first request includes an identifier of the first service;

the first device, further configured to schedule the first request to a second device;

the second device, configured to send a second request to the first device, where the second request includes the identifier of the first service and first output information corresponding to the first service, and the second request is associated with the first request;

the first device, further configured to schedule the second request to a third device when the first output information does not meet a specified condition, where the third device is different from the second device;

the third device, configured to send a third request to the first device, where the third request includes the identifier of the first service and second output information corresponding to the first service, and the third request is associated with the second request; and the first device is further configured to schedule the third request to the third device when the second output information does not meet the specified condition.

According to a sixth aspect, an embodiment of the present invention provides a device, including a processor and a memory, where the memory is configured to store a program, the program includes program instructions, and when the processor runs the program instructions, the device is enabled to perform the steps of the foregoing method.

According to a seventh aspect, an embodiment of the present invention provides a readable storage medium, where the readable storage medium stores a program, the program includes program instructions, and when the program requests are run by a device, the device is enabled to perform the foregoing method.

According to an eighth aspect, an embodiment of the present invention provides a program product, where the program product includes instructions, and when the program product runs on a device or at least one processor, the device is enabled to perform the function/step in the foregoing method.

In the technical solutions of the request scheduling method and the device provided in embodiments of the present invention. A first device receives a first request from a first user, where the first request is a request for a first service, and the first request includes an identifier of the first service; the first device schedules the first request to a second device; the second device sends a second request to the first device, where the second request includes the identifier of the first service and first output information, and the second request is associated with the first request; when the first output information does not meet a specified condition, the first device schedules the second request to a third device, where the third device is different from the second device; the third device sends a third request to the first device, where the third request includes the identifier of the first service and second output information, and the third request is associated with the second request; and when the second output information does not meet the specified condition, the first device schedules the third request to the third device, so that a throughput of a service system in a large-scale language model service deployment can be improved.

BRIEF DESCRIPTION OF THE DRAWINGS

FIG. 6A and FIG. 6B are a signaling interaction diagram of another request scheduling method according to an embodiment of the present invention;

FIG. 7A and FIG. 7B are a flowchart of a request scheduling method according to an embodiment of the present invention;

FIG. 10 is a diagram of a structure of a second device according to an embodiment of the present invention; and FIG. 11 is a diagram of a structure of a third device according to an embodiment of the present invention.

DETAILED DESCRIPTION OF ILLUSTRATIVE EMBODIMENTS

To make the technical solutions in the present invention more comprehensible, the following describes embodiments of the present invention in detail with reference to the accompanying drawings.

It should be clear that the described embodiments are merely some but not all of embodiments of the present invention. All other embodiments obtained by persons of ordinary skill in the art based on the embodiments of the present invention without creative efforts shall fall within the protection scope of the present invention.

The terms used in embodiments of the present invention are merely for the purpose of illustrating specific embodiments, and are not intended to limit the present invention. The terms "a", "said" and "the" of singular forms used in embodiments and the appended claims of the present invention are also intended to include plural forms, unless otherwise specified in the context clearly.

It should be understood that the term "and/or" used in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
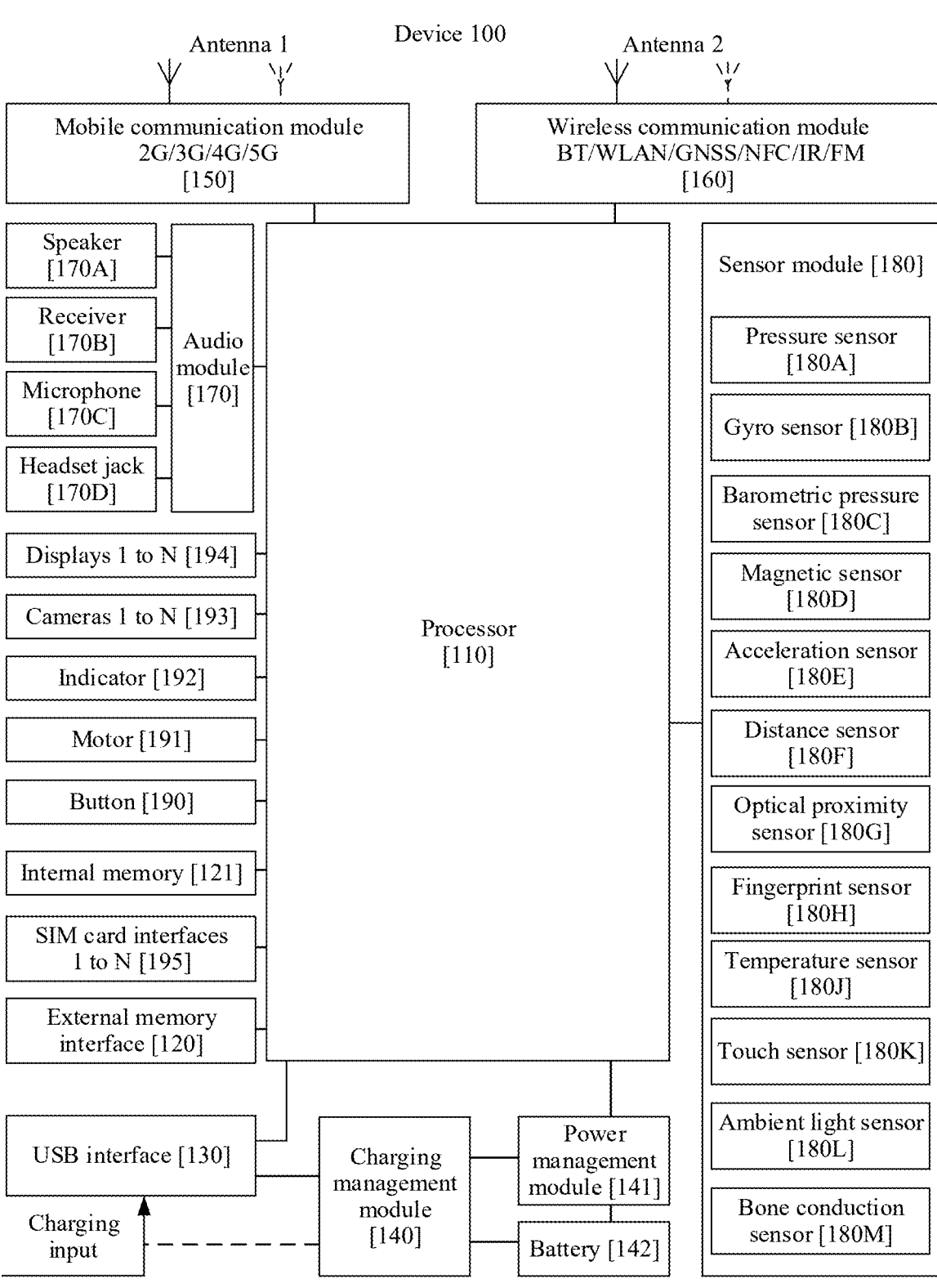
FIG. 1 is a diagram of a structure of a device according to an embodiment of the present invention.

FIG. 1 is a diagram of a structure of a device 100.

The device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the device 100. In some other embodiments of this application, the device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through an I2C bus interface, to implement a touch function of the device 100.

The I2S interface may be configured to perform audio communication. In some embodiments, the processor no may include a plurality of groups of I2S buses. The processor no may be coupled to the audio module 170 through the I2S bus, to implement communication between the processor 110 and the audio module 170. In some embodiments, the audio module 170 may transmit a sound signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit a sound signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit a sound signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the device 100. The processor 110 communicates with the display 194 through the DSI interface, to implement a display function of the device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be used to be connected to the charger to charge the device 100, or may be used to transmit data between the device 100 and a peripheral device, or may be configured to connect to a headset for playing audio through the headset. The interface may be further used to connect to another device, like an AR device.

It may be understood that an interface connection relationship between the modules that is shown in this embodiment of the present invention is merely an example for description, and does not constitute a limitation on a structure of the device 100. In some other embodiments of this application, the device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the device 100. The charging management module 140 may further supply power to the device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is used in the device 100, including 2G/3G/4G/5G and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is used in the device 100, and that includes a wireless local area network (wireless local area networks, WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the device 100 are coupled, and the antenna 2 and the wireless communication module 160 in the device 100 are coupled, so that the device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel.

The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the device 100 may include one or N displays 194. N is a positive integer greater than 1.

The device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the device 100 may include one or N cameras 193. N is a positive integer greater than 1.

The digital signal processor is configured to process a digital signal, and may process another digital signal in addition to the digital image signal. For example, when the device 100 selects a frequency bin, the digital signal processor is configured to perform Fourier transformation or the like on energy at the frequency bin.

The video codec is configured to compress or decompress a digital video. The device 100 may support one or more video codecs. In this way, the device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, a transfer mode between human brain neurons, and may further continuously perform self-learning. Applications such as intelligent cognition of the device 100 may be implemented through the NPU, for example, image recognition, facial recognition, speech recognition, and text understanding The external memory interface 120 may be used to connect to an external storage card, for example, a micro SD card, to extend a storage capability of the device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area.

The program storage area may store an operating system, an application required by at least one function (for example, a voice playing function or an image playing function), and the like. The data storage area may store data (such as audio data and an address book) created during use of the device 100, and the like. In addition, the internal memory 121 may include a high-speed random access memory, or may include a nonvolatile memory, for example, at least one magnetic disk storage device, a flash memory, or a universal flash storage (UFS). The processor 110 runs instructions stored in the internal memory 121 and/or instructions stored in the memory disposed in the processor, to perform various function applications and data processing of the device 100.

The device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The device 100 may be used to listen to music or answer a call in a hands-free mode over the speaker 170A.

The receiver 170B, also referred to as an "earpiece", is configured to convert an electrical audio signal into a sound signal. When a call is answered or a voice message is received through the device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed on the device 100. In some other embodiments, two microphones 170C may be disposed in the device 100, to collect a sound signal and further implement a noise reduction function. In some other embodiments, three, four, or more microphones 170C may alternatively be disposed in the device 100, to collect a sound signal, reduce noise, identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The device 100 determines pressure intensity based on a capacitance change. When a touch operation is performed on the display 194, the device 100 detects intensity of the touch operation through the pressure sensor 180A. The device 100 may calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a motion posture of the device 100. In some embodiments, angular velocities of the device 100 around three axes (which are x, y, and z axes) may be determined by using the gyro sensor 180B. The gyro sensor 180B may be configured to implement image stabilization during photographing. For example, when the shutter is pressed, the gyro sensor 180B detects a shake angle of the device 100, and calculates, based on the angle, a distance for which a lens module needs to compensate, so that the lens counteracts the shake of the device 100 through reverse motion, implementing image stabilization. The gyro sensor 180B may also be used in a navigation scenario and a somatic game scenario.

The barometric pressure sensor 180C is configured to measure barometric pressure. In some embodiments, the device 100 calculates an altitude based on a value of the barometric pressure measured by the barometric pressure sensor 180C, to assist in positioning and navigation.

The magnetic sensor 180D includes a Hall sensor. The device 100 may detect opening and closing of a flip cover by using the magnetic sensor 180D. In some embodiments, when the device 100 is a flip device, the device 100 may detect opening and closing of flip by using the magnetic sensor 180D. Further, a feature such as automatic unlocking of the flip cover is set based on a detected opening or closing state of the leather case or a detected opening or closing state of the flip cover.

The acceleration sensor 180E may detect magnitudes of accelerations of the device 100 in all directions (usually on three axes). When the device 100 is still, a magnitude and a direction of gravity may be detected. The acceleration sensor 180E may be further configured to recognize a posture of the device, and is used in screen switching between a landscape mode and a portrait mode, a pedometer, or another application.

The distance sensor 180F is configured to measure a distance. The device 100 may measure a distance through infrared or laser. In some embodiments, in a photographing scenario, the device 100 may measure the distance by using the distance sensor 180F, to implement fast focusing.

The optical proximity sensor 180G may include, for example, a light emitting diode (LED) and an optical detector, for example, a photodiode. The light emitting diode may be an infrared light emitting diode. The device 100 emits infrared light outward by using the light-emitting diode. The device 100 detects infrared reflected light from a nearby object by using the photodiode. When sufficient reflected light is detected, the device 100 may determine that there is an object near the device 100. When insufficient reflected light is detected, the device 100 may determine that there is no object near the device 100. The device 100 may use the optical proximity sensor 180G to detect that a user holds the device 100 close to an ear for a call, to automatically turn off the display screen to save power. The optical proximity sensor 180G may also be used in a smart cover mode or a pocket mode to automatically perform screen unlocking or locking.

The ambient light sensor 180L is configured to sense ambient light brightness. The device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the device 100 is in a pocket, to avoid an unintentional touch.

The fingerprint sensor 180H is configured to collect a fingerprint. The device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the device 100 executes a temperature processing policy by using the temperature detected by the temperature sensor 18J. For example, when the temperature reported by the temperature sensor 180J exceeds a threshold, the device 100 degrades performance of a processor near the temperature sensor 180J, to reduce power consumption for thermal protection. In some other embodiments, when the temperature is less than another threshold, the device 100 heats the battery 142 to avoid abnormal shutdown of the device 100 caused by a low temperature. In some other embodiments, when the temperature is less than still another threshold, the device 100 boosts an output voltage of the battery 142 to avoid abnormal shutdown caused by a low temperature.

The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the device 100 at a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The device 100 may receive a button input, and generate a button signal input related to user settings and function control of the device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or pulled out of the SIM card interface 195, so that the SIM card is in contact with and separated from the device 100. The device 100 may support one or N SIM card interfaces. N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The device 100 interacts with the network by using the SIM card, to implement a call function, a data communication function, and the like. In some embodiments, the device 100 uses an eSIM, namely, an embedded SIM card. The eSIM card may be embedded into the device 100, and cannot be separated from the device 100.

A software system of the device 100 may use a layered architecture, an event-driven architecture, a microkernel architecture, a micro service architecture, or a cloud architecture. In this embodiment of the present invention, an Android system of a layered architecture is used as an example to illustrate the software structure of the device 100.

Figure 2:
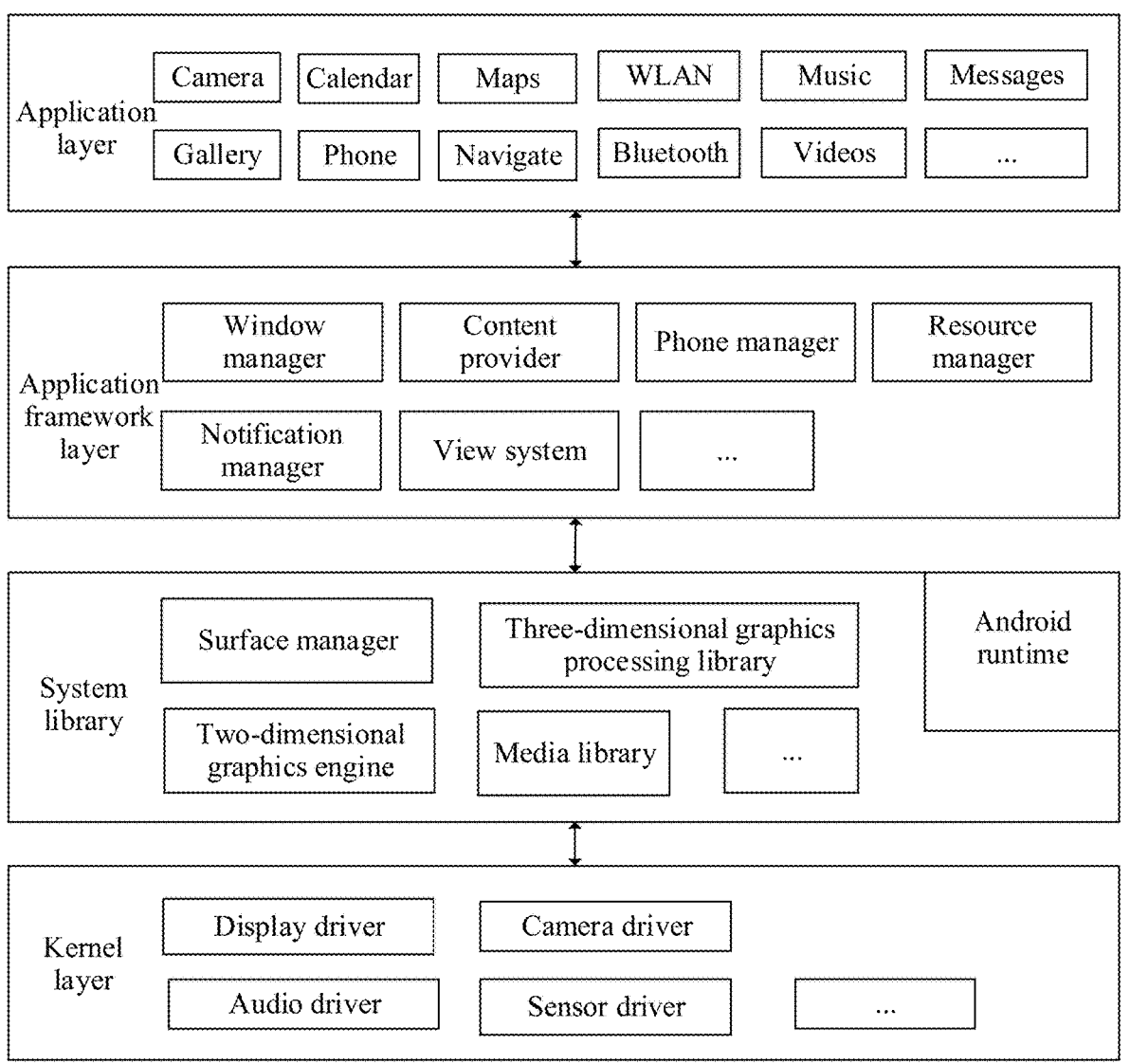
FIG. 2 is a block diagram of a software structure of a device 100 according to an embodiment of the present invention.

FIG. 2 is a block diagram of a software structure of the device 100 according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2, an application package may include applications such as Camera, Gallery, Calendar, Phone, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function for the device 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the device 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the camera 193.

First, a related technology of the request scheduling method in embodiments of the present invention is explained, to facilitate understanding of a person skilled in the art.

Transformer: a special structure in the deep learning field, including two parts, namely, multi-head self-attention and forward feedback. According to this mechanism, different weights may be allocated based on different importance of parts of input data. This model is mainly used in the fields of natural language processing (NLP) and computer vision (CV).

Token: A token corresponds to a word in a text in Chinese natural language processing. An input text is mapped through an analyzer and vocabulary to obtain a corresponding token sequence, and then the corresponding token sequence is sent to the model for further processing.

Prefill inference: Generally, a length of input information is large, and a latency is a decisive factor. As a result, a computing bottleneck exists.

Decode inference: a length of input information is fixed to 1, a delay overhead is low, and a memory access bottleneck exists.

A throughput (Throughout) is a quantity of requests processed by a system in a unit time. A formula for calculating the throughput in the present invention is as follows:

$$TPS = \frac{\text{quantity of total requests}}{\text{quantity of chips} * \text{processing duration}}.$$

A large-scale language model has set off a new wave in the AI industry. An inference process of a GPT model represented by a generative model is characteristic. Given a group of input token sequences with a length of S, the model outputs an output token sequence with a length of N. Actually, there are N inference processes in this process. That is, the GPT model outputs only one token in each inference process. The output token is concatenated with a previous input token to obtain (S+1, S+2, . . . , S+N−1), used as an input in a next inference process until a terminator or a maximum output length is encountered.

Such a processing manner introduces a problem that a computing amount in each inference process increases accordingly with an increase in a quantity of iterations. In addition, because each iteration includes an input part of a previous iteration, there is a large amount of redundant computation. Therefore, a person skilled in the art uses a KV cache technology to maintain a computing amount of each round of inference after the first round of iteration basically constant, so as to reduce computing power and reduce an inference delay.

A GPT inference process using the KV cache technology is divided into a first phase, namely, a first-round context filling (Prefill) phase, and a second phase, namely, a multi-round decode phase.

In the prefill phase, an input data dimension is [B, S], where B is a dimension of a group batch, that is, a common batch in machine learning. A data processing and transmission dimension at an intermediate layer of the model is [B, S, H], where H is a hidden layer dimension. An output data dimension is [B, 1], that is, a quantity of tokens in a batch is B. If there is only one batch, there is only one token, and inference is performed only once. During the inference, key-value KV cache information at the intermediate layer, namely, a transformer layer, is cached in a KV cache, for use in the decoding phase.

In the decoding phase, an input data dimension is [B, 1]. A data processing and transmission dimension at the intermediate layer of the model is [B, 1, H]. An output data dimension is [B, 1]. The decoding phase is executed N times until a stop condition is met. Similarly, in an inference process, key-value KV cache information stored in a previous round is first obtained from the KV cache, and then newly generated key-value KV cache information is cached in the KV cache for update.

TABLE 1

| Relationship between computing amount and memory access in the GPT model | | |
| --- | --- | --- |
| S = 4K/16K | Prefill phase | Decoding phase |
| Computing amount (TFLOPS) | 572/2816 | 0.1396/0.1719 |
| Memory access (TB) | 0.1853/0.3867 | 0.1343/0.1504 |
| Ratio of computing amount to memory access (FLOPS/Byte) | 3087/7281 | 1.04/1.14 |

Through statistical computing, a relationship between a computing amount and memory access in an inference process when B=1, L=88, and S=4K/16K may be obtained. As shown in Table 1, L is a quantity of transformers at a network layer. It is clear that computing is a decisive factor (a high latency and a computing bottleneck) in the prefill phase, but memory access is a decisive factor (a low latency and a memory access bottleneck) in the decoding phase. When there are a large quantity of service requests from users, group batching is performed on different service requests for inference. A significant difference between the two inference phases causes two problems: 1. Because a length supplement manner is usually used, to be specific, a length of a short input statement in a batch is supplemented to a length of a long input statement, and then inference is performed, there is a large amount of invalid computation in the prefill phase for the short input statement. 2. Short output statements are output in a unified manner after inference of the longest output statement in a batch is complete, resulting in a large amount of invalid computation. These two problems result in a very low throughput of the entire system.

Based on the foregoing technical problem, an embodiment of the present invention provides a request scheduling system. The present invention mainly improves a throughput of a service system in a large-scale language model service deployment. The large-scale language model is for a model with a transformer structure.

Currently, a main problem is that there are two inference states in a large model inference process: prefill phase and decoding phase. The significant difference in computing power and memory access in the two phases and characteristics of the two phases are not considered during service deployment. Two phases are all deployed on the same compute node, and when a large quantity of services request services at the same time, service deployment costs are high if a single service request exclusively uses the same compute node. A large amount of redundant computing and latency overheads exist in group batch inference (that is, different services are grouped into batches and placed on the same compute node), resulting in a low overall throughput of the service system.

Figure 3:
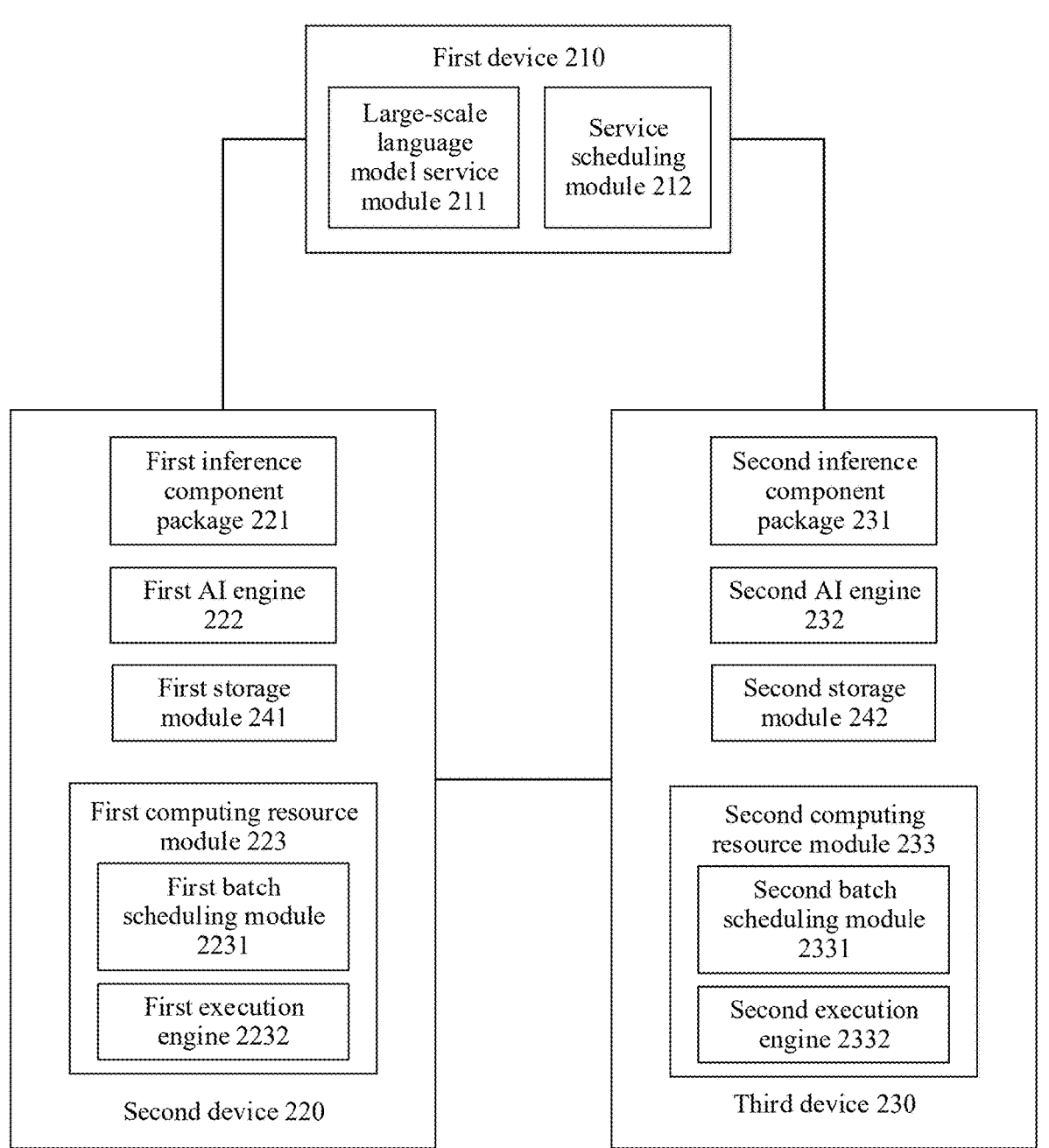
FIG. 3 is a diagram of an architecture of a request scheduling system according to an embodiment of the present invention.

FIG. 3 is a diagram of an architecture of a request scheduling system according to an embodiment of the present invention.

The request scheduling system includes a first device, at least one second device, and at least one third device. Both the second device and the third device are connected to the first device. The connection includes a wired connection or a wireless connection.

For a hardware structure and a software structure of the device provided in this embodiment of the present invention, refer to related descriptions of the device 100 in FIG. 1 and FIG. 2.

For example, the first device includes a server.

For example, the second device and the third device each include an electronic device having a computing capability. The electronic device includes a computing card. For example, the computing card includes a GPU or an NPU. The second device is configured to perform prefill inference, that is, inference in a prefill phase. The third device is configured to perform decode inference, that is, inference in a decoding phase.

For example, the request scheduling system includes the first device, the second device, and the third device. As shown in FIG. 3, the request scheduling system includes a first device 210, a second device 220, and a third device 230.

The first device 210 includes a large-scale language model (LLM) service module 211 and a service scheduling module 212.

The LLM service module 211 is configured to interconnect with an external user service entry.

The service scheduling module 212 is configured to schedule a new service to enter the second device 220, and schedule an old service that does not meet a stop condition to enter the third device 230.

The second device 220 includes a first inference component package 221, a first AI engine 222, and a first computing resource module 223.

The first inference component package 221 and the first AI engine 222 are configured to deploy a large-scale language model and invoke a resource.

The first computing resource module 223 includes a first batch scheduling module 2231 and a first execution engine 2232.

The first batch scheduling module 2231 is configured to dynamically group batches or dynamically insert new services. The new service is a service that does not pass through the prefill phase.

The first execution engine 2232 is configured to perform inference computing on the service requests output by the first batch scheduling module 2231.

The third device 230 includes a second inference component package 231, a second AI engine 232, and a second computing resource module 233.

The second inference component package 231 and the second AI engine 232 are configured to deploy a large-scale language model and invoke a resource.

The second computing resource module 233 includes a second batch scheduling module 2331 and a second execution engine 2332.

The second batch scheduling module 2331 is configured to perform dynamic group batching, dynamic insertion, or dynamic early stopping on an old service that does not meet a stop condition. The old service is a service that passes through the prefill phase.

The second execution engine 2332 is configured to perform inference computing on the service requests output by the second batch scheduling module 2331.

As shown in FIG. 3, the second device 220 further includes a first storage module 241, and the third device 230 further includes a second storage module 242. The second device 220 is connected to the third device 230 in a wired or wireless manner.

In some possible embodiments, the first storage module 241 is configured to: cache first cache information generated by the second device 220 in an inference process, and transmit the cached first cache information to the second storage module 242. The second execution engine 2232 is configured to obtain the first cache information from the second storage module 242 in the inference process.

In some possible embodiments, the first execution engine 2232 does not send, to the first storage module 241, the first cache information generated by the second device 220 in the inference process, but directly sends the first cache information to the second execution engine 2232, so that the second execution engine 2232 uses the first cache information in the inference process.

The second storage module 242 is further configured to cache cache information generated by the third device 230 in the inference process. The second execution engine 2232 is configured to obtain, from the second storage module 242 in the inference process, cache information generated in a previous inference process.

For example, the cache information is key-value KV cache information.

Requests for a plurality of services are scheduled by the service scheduling module 212 to the second device 220 or the third device 230. The second device 220 or the third device 230 performs computing to obtain output information of a current iteration and corresponding cache information, and the output information is returned to the service scheduling module 212. When the stop condition is not met, the service scheduling module 212 schedules the service to the idle third device 230 to perform a next round of inference. After inference iteration, the service continues to be returned to the service scheduling module 212. When the stop condition is met, the service scheduling module 212 ends scheduling of the service, and provides an external service response.

In addition, in this embodiment of the present invention, in the request scheduling system, the second device 220, that is, a prefill inference execution container, and the third device 230, that is, a decode inference execution container, are deployed in an independent separate deployment manner. The first device schedules a request, so that the second device and the third device respectively perform inference processes in respective phases. In addition, communication transfer may be performed between the two devices, so that the inference process can be normally performed, and a throughput of the service system can be improved.

Each of the two execution containers has a batch scheduling module. The batch scheduling module implements two functions: automatic batching and automatic early stopping. Automatic batching is used to dynamically group input information of a plurality of service requests into batches, and includes two manners: group batching and dynamic insertion. Automatic early stopping is used to stop a completed service in advance, release a corresponding resource, and notify the system that the current resource can be inserted and occupied by a next service.

In the separate deployment manner, a significant difference between a computing power bottleneck in the prefill phase and a memory access bottleneck in the decoding phase is comprehensively considered, so that a throughput of the service system can be improved.

When there are a large quantity of second devices and third devices in the request scheduling system, the second devices and the third devices are deployed in an independent separate deployment manner. A small batch or a single batch is configured for the second devices, and a large batch is configured for the third devices. A resource proportion of the second device resource to the third device resource may be dynamically adjusted based on system load, to obtain a maximum throughput. The present invention can greatly improve the throughput of the service system.

Figure 4A:
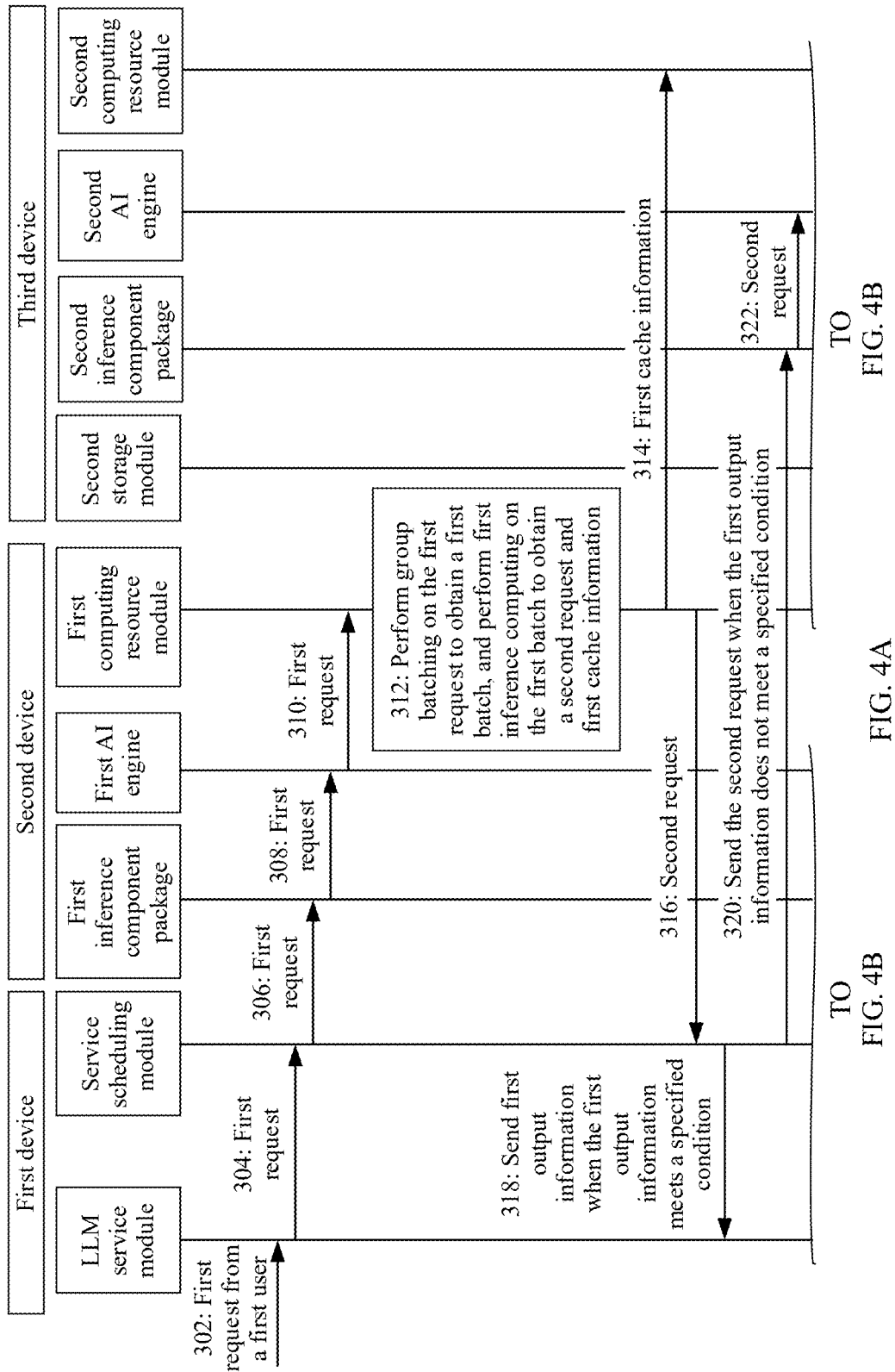
FIG. 4A and FIG. 4B are a signaling interaction diagram of a request scheduling method according to an embodiment of the present invention.
Figure 4B:
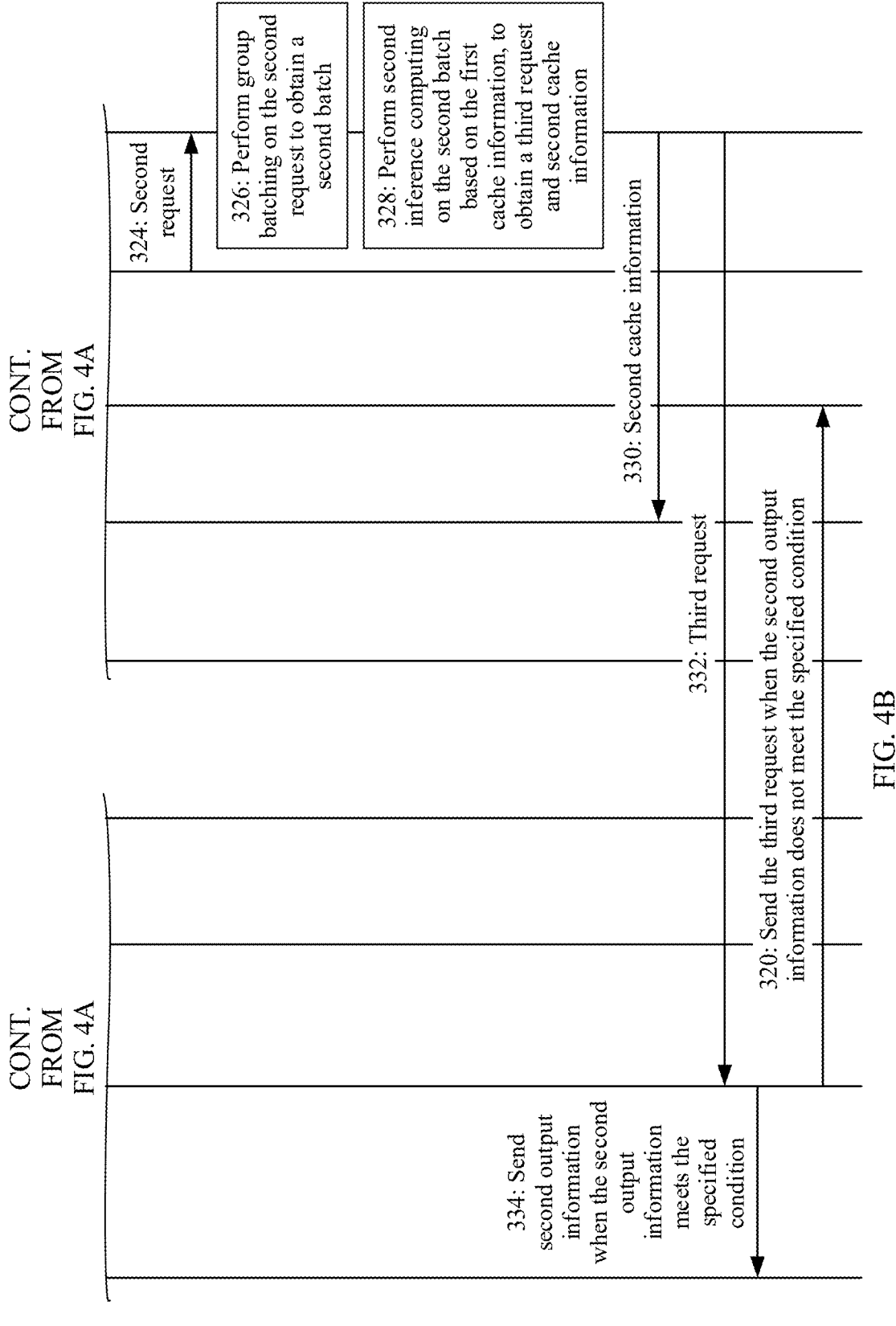

Based on the system architecture shown in FIG. 3, an embodiment of the present invention provides a request scheduling method. FIG. 4A and FIG. 4B are a signaling interaction diagram of a request scheduling method according to an embodiment of the present invention. As shown in FIG. 4A and FIG. 4B, the method includes the following steps.

Step 302: An LLM service module receives a first request from a first user. Before step 302, that is, before a request scheduling system responds to a service, an LLM has been deployed to computing resource modules in the second device 220 and the third device 230 by using an inference component package and an AI engine, and both the computing resource module and a storage module are ready.

For example, the first request is a request for a first service.

For example, the first request includes an identifier of the first service.

For example, the identifier includes a service ID.

For example, the first request does not include requests returned by the second device and the third device. In other words, the first request is a request for a new service.

In this step, as shown in FIG. 3, the LLM service module receives the first request from the first user.

Step 304: The LLM service module sends the first request to a service scheduling module.

In this step, as shown in FIG. 3, the LLM service module sends the first request to the service scheduling module.

Step 306: The service scheduling module sends the first request to a first inference component package.

In this step, as shown in FIG. 3, the service scheduling module schedules a newly arrived service request to a prefill inference execution container, namely, the second device, and establishes a service pool to store a request for a service that waits due to a resource limitation.

Step 308: The first inference component package sends the first request to a first AI engine.

In this step, as shown in FIG. 3, the first inference component package sends the first request to the first AI engine.

Step 310: The first AI engine sends the first request to a first computing resource module.

In this step, as shown in FIG. 3, the first AI engine sends the first request to the first computing resource module.

Step 312: The first computing resource module performs group batching on the first request to obtain a first batch, and performs first inference computing on the first batch to obtain a second request and first cache information.

In this step, as shown in FIG. 3, a first batch scheduling module of the first computing resource module performs, based on a first computing resource status and a first condition, group batching on the first request and at least one seventh request that arrives at the second device at the same time as the first request, to obtain the first batch. A first execution engine of the first computing resource module performs first inference computing on the first batch, to obtain the second request and the first cache information. The seventh request is a request from the first user, a second user, or another user.

For example, the first request further includes input information.

For example, the input information includes an input token sequence.

For example, the first computing resource status includes a quantity of idle resources in the second device.

For example, the first condition includes a maximum quantity of requests grouped by the second device in a batch.

For example, the second request includes the identifier of the first service and first output information corresponding to the first service, and the second request is associated with the first request.

For example, the first output information includes an output token sequence. The first output information is a first output token sequence.

For example, cache information includes key-value KV cache information. The first cache information is first key-value KV cache information.

In some possible embodiments, step 312 specifically includes: The first batch scheduling module in the first computing resource module obtains, based on the first request, the input information corresponding to the first request and a first length of the input information, and performs, based on the first computing resource status, the first condition, and the first length, group batching on the first request and the at least one seventh request that arrives at the second device at the same time as the first request, to obtain a first batch; and the first execution engine of the first computing resource module performs first inference computing on the first batch in a single-batch processing manner, to obtain the second request and the first cache information of the first service. A length of input information corresponding to the seventh request is similar to the first length. This helps reduce a waste of idle resources in a first inference computing process.

For example, the first batch includes a plurality of requests.

For example, the first batch scheduling module groups a plurality of requests that arrive at a same moment into one batch.

For example, the first inference computing is inference computing in a prefill phase, namely, prefill computing.

For example, in a first processing manner, after inference computing of all requests in a current batch ends, computing service resources occupied by the current batch are released, and a next batch is inserted into the idle computing service resources to perform first inference computing. In this embodiment of the present invention, for inference computing in the prefill phase, inference computing is performed based on a single batch. To be specific, after inference computing of all requests in a current batch ends, computing service resources occupied by the current batch are released, and a next batch is inserted into an idle computing service resource for starting to perform the first inference computing on the next batch.

For example, when releasing the computing service resource occupied by the current batch, the second device further releases storage resources occupied by the current batch.

For example, when the second device has an idle computing service resource, the second device notifies the first device that the second device has the idle computing service resource, and the first device schedules a new service to the second device based on the notification.

For example, when the second device has no idle computing service resource, the second device notifies the first device that the second device has no idle computing service resource, and the first device suspends, based on the notification, scheduling a new service to the second device.

Step 314: The first computing resource module sends the first cache information to a second computing resource module.

In this step, as shown in FIG. 3, the first execution engine of the first computing resource module sends the first cache information to the second computing resource module.

Optionally, as shown in FIG. 3, the first computing resource module may send the first cache information to a first storage module, the first storage module sends the first cache information to a second storage module, and then the second storage module sends the first cache information to a second execution engine module. The second storage module may automatically send the first cache information to the second execution engine module, or may send the first cache information to the second execution engine module based on a message sent by the second execution engine module.

Optionally, as shown in FIG. 3, the first computing resource module may directly send the first cache information to the second computing resource module.

Step 316: The first computing resource module sends the second request to the service scheduling module. 318 or 320 continues to be performed.

In this step, as shown in FIG. 3 and FIG. 4A and FIG. 4B, the first computing resource module sends the second request to the service scheduling module.

Step 318: When the first output information meets a specified condition, the service scheduling module sends the first output information to the LLM service module. The LLM service module sends the first output information to the first user, and a process ends.

In this embodiment of the present invention, the first device determines whether the output information of the service meets the specified condition. If the specified condition is not met, the first device continues to perform scheduling and inference computing on the service. If the specified condition is met, the first device performs early stopping on the service, and sends second output information to the first user.

Step 320: When the first output information does not meet a specified condition, the service scheduling module schedules the second request to a second inference component package.

In this step, as shown in FIG. 3, the service scheduling module sends the second request to the second inference component package.

For example, the second request is a request for the first service returned by the second device.

For example, the specified condition includes at least one of the following:

a length of output information is greater than or equal to a first threshold; or output information includes a terminator.

Step 322: The second inference component package sends the second request to a second AI engine.

In this step, as shown in FIG. 3, the second inference component package sends the second request to the second AI engine.

Step 324: The second AI engine sends the second request to the second computing resource module.

In this step, as shown in FIG. 3, the second AI engine sends the second request to the second computing resource module.

Step 326: The second computing resource module performs group batching on the second request to obtain a second batch.

In this step, as shown in FIG. 3, a second batch scheduling module of the second computing resource module performs group batching on the second request based on a second computing resource status and a second condition to obtain the second batch.

In some possible embodiments, step 326 specifically includes: The second batch scheduling module performs, based on the second computing resource status and the second condition, group batching on the second request and at least one eighth request that arrives at the third device at the same time as the second request, to obtain the second batch, where the eighth request is from the second device or the third device.

For example, the second computing resource status includes a quantity of idle resources in the third device.

For example, the second condition includes a maximum quantity of batches grouped by the third device.

For example, the second batch includes a plurality of requests.

For example, the second batch scheduling module groups at least one request that arrives at a same moment into one batch. In the decoding phase, an input length of each request is 1. Provided that there is an idle position in the current batch, a token whose length is 1 can be placed in the batch for inference.

Step 328: The second computing resource module performs second inference computing on the second batch based on the first cache information, to obtain a third request and second cache information.

In this step, as shown in FIG. 3, the second execution engine of the second computing resource module performs second inference computing on the second batch based on the first cache information, to obtain the third request and the second cache information.

In some possible embodiments, step 328 specifically includes: The second execution engine of the second computing resource module performs second inference computing on the second batch in a second processing manner based on the first cache information, to obtain the third request and the second cache information of the first service.

For example, the third request includes the identifier of the first service and the second output information corresponding to the first service, and the third request is associated with the second request.

For example, the second cache information is cache information required when the third device performs second inference computing on the third request.

For example, the second inference computing is inference computing in the decoding phase, namely, decode computing.

For example, in a second processing manner, if there is a target request whose output information meets the specified condition in a current batch inference process, a computing service resource of the target request is released, and a request in a next batch is inserted into the idle computing service resource to perform second inference computing. In this embodiment of the present invention, for inference computing in the decoding phase, inference computing is performed based on a plurality of batches. To be specific, in the current batch inference process, if a service ends inference in advance, that is, there is a target request whose output information meets the specified condition, a computing service resource of the target request may be released in advance, and before the current batch ends, a request in a next batch is inserted into the idle computing service resource to perform the second inference computing. Therefore, compared with the first processing manner in which the resources of the current batch are released only after inference of all the requests in the current batch ends, the second processing manner in which the resources of the current batch are released without waiting for inference of all the requests in the current batch to be ended, so that no idle resource is wasted, and a system throughput is further improved.

For example, when releasing the computing service resource occupied by the target request, the third device further releases a storage resource occupied by the target request.

For example, when the third device has an idle computing service resource, the third device notifies the first device that the third device has the idle computing service resource, and the first device schedules an old service to the second device based on the notification.

For example, when the third device has no idle computing service resource, the third device notifies the first device that the third device has no idle computing service resource, and the first device suspends, based on the notification, scheduling the old service to the third device.

Step 330: The second computing resource module sends the second cache information to the second storage module.

In this step, as shown in FIG. 3, the second execution engine of the second computing resource module sends the second cache information to the second storage module.

Step 332: The second computing resource module sends the third request to the service scheduling module. Step 334 or step 336 continues to be performed.

In this step, as shown in FIG. 3, the second execution engine of the second computing resource module sends the third request to the service scheduling module.

For example, the third request is a request for the first service returned by the third device.

Step 334: When the second output information meets the specified condition, the service scheduling module sends the second output information to the LLM service module. The LLM service module sends the second output information to the first user, and a process ends.

In this embodiment of the present invention, the first device determines whether the output information of the service meets the specified condition. If the specified condition is not met, the first device continues to perform scheduling and inference computing on the service. If the specified condition is met, the first device performs early stopping on the service, and sends the second output information to the first user. After early stopping the service, the first device may indicate the third device to release a resource corresponding to the service. The third device reports a current resource status of the third device to the first device. If there is an idle computing service resource in the current resource status, the first device continues to schedule a service to the third device to insert the idle computing service resource, to implement dynamic insertion.

In this step, as shown in FIG. 3, when the second output information meets the specified condition, the service scheduling module sends the second output information to the LLM service module. The LLM service module sends the second output information to the first user, and a process ends.

Step 336: When the second output information does not meet the specified condition, the service scheduling module schedules the third request to the second inference component package.

In this step, as shown in FIG. 3, when the second output information does not meet the specified condition, the service scheduling module sends the third request to the second inference component package, so that the third device continues to perform a next round of decode computing on the third request, and uses, in the next round of decode computing, the second cache information generated in a previous round of decode computing. The second execution engine sends cache information generated in the next round of decode computing to the second storage module for storage, for use of the second execution engine when performing a still next round of decode computing.

Figure 5:
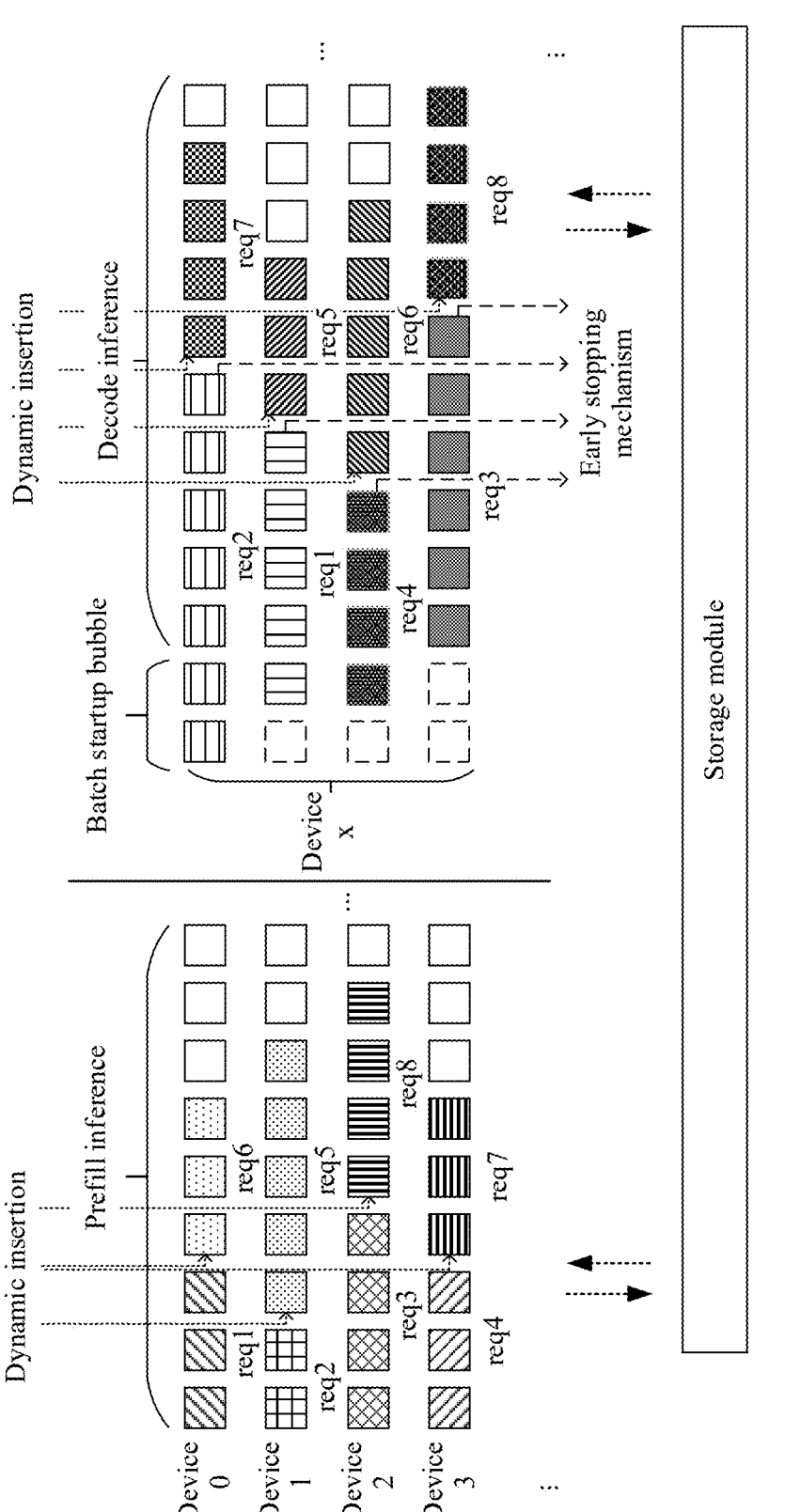
FIG. 5 is a diagram of prefill inference and decode inference according to an embodiment of the present invention.

For example, the request scheduling system includes four second devices and one third device. FIG. 5 is a diagram of prefill inference and decode inference according to an embodiment of the present invention. As shown in FIG. 5, the four second devices are a device 0, a device 1, a device 2, and a device 3, and one third device is a device x. FIG. 5 shows an inference process in which a first processing manner is used for prefill inference and a second processing manner is used for decode inference. To be specific, a row in prefill inference on the left side indicates that a group of computing resources are used to process a request for one service, and there are four groups of prefill computing resources and requests for four services in total; and four rows in the decode inference on the right side indicate that a group of computing resources are used to process requests of services whose quantity is 4 in a batch, and there are one group of computing resources and requests for four services in total. In FIG. 5, each grid represents a computing latency. Prefill computing on the left side and decode computing on the right side are performed in parallel. There is no time sequence relationship.

A process of the prefill inference and the decode inference shown in FIG. 5 is described below.

(1) Lengths of input token sequences of the four services req1, req2, req3, and req4 are respectively 3, 2, 4, and 3. Therefore, when the four services arrive at the device 0, the device 1, the device 2, and the device 3 at the same time, computing of req2 is complete in advance, followed by req1, req4, and req3.

(2) In the prefill computing, the req2 that completes computing in advance enters the decode computing in advance. A diagram of a system startup process is shown on the right side of FIG. 5. The device x needs to form one batch, and the batch includes four requests. In this case, the four services req1, req2, req3, and req4 all need to enter the decode computing. As shown in FIG. 5, in the decode inference on the right side, req2 arrives first, then req1 and req4 arrive, and finally req3 arrives. Therefore, req1 and req4 generate one idle bubble, and req3 generates two idle bubbles. The bubble does not exist again after the system becomes stable.

(3) In the decode computing, a quantity of output tokens of req1 to req4 is 5, 7, 6, and 4, respectively. Therefore, although req4 is the second to enter the decode computing in the prefill computing, req4 is the first to complete the decode computing, and output information of req4 is the first one that meets the specified condition in the batch. For req4 that completes the decode computing, the computing is stopped in advance (early stopping mechanism) and corresponding occupied resources are released. Then, the computing of req1, req2, and req3 is complete.

(4) In the decode computing process of req1to req4, req5 to req8 have reached a prefill inference execution container for computing, and the computing has been completed before the computing of req1 to req4 is complete. Therefore, in a process in which req4, req1, req2, and req3 successively stop the computing, the service scheduling module successively and automatically schedules req6, req5, req7, and req8 to the device x, and the device x successively and respectively inserts req6, req5, req7, and req8 into resource positions occupied by req4, req1, req2, and req3. Subsequent computing is performed after dynamic insertion.

(5) After the system is stable, steps (3) and (4) are repeated for dynamic insertion and group batching, dynamic stop, and providing a service response.

It should be noted that, when scheduling the third request for the first service to the third device, the service scheduling module schedules only the third request to the third device that stores cache information generated through the first service in a previous round of decode inference. Therefore, in the decoding phase, a decode part is a service iterated in the current third device, and a request for the service is not forwarded to another third device.

In conclusion, in the present invention, the execution engine sends, to the service scheduling module, the request that is output through the inference computing, and the service scheduling module determines that the request meets the specified condition, so as to implement automatic early stopping of the service; and the batch scheduling module performs group batching on the request to obtain a batch, so as to implement group batching. When the execution engine has the idle computing service resource, the batch scheduling module automatically sends the request in the next batch to the execution engine for dynamic insertion.

In this embodiment of the present invention, a request for a new service from a user is scheduled to the second device, that is, the prefill inference execution container performs inference computing in the prefill phase; and a request for an old service that passes through the prefill phase is scheduled to the third device, that is, a decode inference execution container performs inference computing in the decoding phase. In the present invention, in a separate deployment manner, a significant difference between a computing power bottleneck in the prefill phase and a memory access bottleneck in the decoding phase is comprehensively considered, so that the throughput of the service system can be improved.

Optionally, as shown in FIG. 6A and FIG. 6B, the method further includes step 338 to step 372.

Step 338: The LLM service module receives a fourth request from the second user. Before step 338, that is, before the request scheduling system responds to the service, the LLM has been deployed to the computing resource modules in the second device and the third device by using the inference component package and the AI engine, and both the computing resource module and the storage module are ready.

For example, the second user is different from the first user. The first device can schedule requests from different users.

For example, the fourth request is a request for the second service.

For example, the fourth request includes an identifier of the second service.

For example, the identifier includes a service ID.

For example, the fourth request does not include requests returned by the second device and the third device. In other words, the fourth request is a request for a new service.

In this step, as shown in FIG. 3, the LLM service module receives the fourth request from the second user.

Step 340: The LLM service module sends the fourth request to the service scheduling module.

In this step, as shown in FIG. 3, the LLM service module sends the fourth request to the service scheduling module.

Step 342: The service scheduling module sends the fourth request to the first inference component package.

In this step, as shown in FIG. 3, the service scheduling module schedules a newly arrived service request to the prefill inference execution container, namely, the second device, and establishes a service pool to store a request for a service that waits due to a resource limitation.

Step 344: The first inference component package sends the fourth request to the first AI engine.

In this step, as shown in FIG. 3, the first inference component package sends the fourth request to the first AI engine.

Step 346: The first AI engine sends the fourth request to the first computing resource module.

In this step, as shown in FIG. 3, the first AI engine sends the fourth request to the first computing resource module.

Step 348: The first computing resource module performs group batching on the fourth request to obtain a third batch, and performs first inference computing on the third batch to obtain a fifth request and third cache information.

In this step, as shown in FIG. 3, the first batch scheduling module of the first computing resource module performs group batching on the fourth request based on the first computing resource status and the first condition to obtain the third batch. The first execution engine of the first computing resource module performs first inference computing on the third batch to obtain the fifth request and the third cache information.

For example, the fourth request further includes input information.

For example, the input information includes an input token sequence.

For example, the first computing resource status includes a quantity of idle resources in the second device.

For example, the first condition includes a maximum quantity of requests grouped by the second device in a batch.

For example, the fifth request includes the identifier of the second service and third output information corresponding to the second service, and the fifth request is associated with the fourth request.

For example, the third output information includes an output token sequence. The third output information is a third output token sequence.

For example, cache information includes key-value KV cache information. The third cache information is third key-value KV cache information.

In some possible embodiments, step 348 specifically includes: The first batch scheduling module in the first computing resource module obtains, based on the fourth request, input information corresponding to the fourth request and a second length of the input information, and performs group batching on the fourth request based on the first computing resource status, the first condition, and the second length, to obtain a third batch; and the first execution engine of the first computing resource module performs first inference computing on the third batch in the first processing manner, to obtain the fifth request and the third cache information of the second service.

For example, the third batch includes a plurality of requests.

For example, the first batch scheduling module groups a plurality of requests that arrive at a same moment into one batch.

For example, the first inference computing is inference computing in the prefill phase, namely, prefill computing.

For example, in a first processing manner, after inference computing of all requests in a current batch ends, computing service resources occupied by the current batch are released, and a next batch is inserted into the idle computing service resources to perform first inference computing.

Step 350: The first computing resource module sends the third cache information to the second computing resource module.

In this step, as shown in FIG. 3, the first execution engine of the first computing resource module sends the third cache information to the second computing resource module.

Optionally, as shown in FIG. 3, the first computing resource module may send the third cache information to the first storage module, the first storage module sends the third cache information to the second storage module, and then the second storage module sends the third cache information to the second execution engine module. The second storage module may automatically send the third cache information to the second execution engine module, or may send the third cache information to the second execution engine module based on a message sent by the second execution engine module.

Optionally, as shown in FIG. 3, the first computing resource module may directly send the third cache information to the second computing resource module.

Step 352: The first computing resource module sends the fifth request to the service scheduling module. Step 354 or step 356 continues to be performed.

In this step, as shown in FIG. 3 and FIG. 4A and FIG. 4B, the first computing resource module sends the fifth request to the service scheduling module.

Step 354: When the third output information meets the specified condition, the service scheduling module sends the third output information to the LLM service module. The LLM service module sends the third output information to the second user, and a process ends.

Step 356: When the third output information does not meet the specified condition, the service scheduling module schedules the fifth request to the second inference component package.

In this step, as shown in FIG. 3, the service scheduling module sends the fifth request to the second inference component package.

For example, the fifth request is a request for the second service returned by the second device.

For example, the specified condition includes at least one of the following:

a length of output information is greater than or equal to a first threshold; or output information includes a terminator.

Step 358: The second inference component package sends the fifth request to the second AI engine.

In this step, as shown in FIG. 3, the second inference component package sends the fifth request to the second AI engine.

Step 360: The second AI engine sends the fifth request to the second computing resource module.

In this step, as shown in FIG. 3, the second AI engine sends the fifth request to the second computing resource module.

Step 362: The second computing resource module performs group batching on the fifth request to obtain a fourth batch.

In this step, as shown in FIG. 3, the second batch scheduling module of the second computing resource module performs group batching on the fifth request based on the second computing resource status and the second condition to obtain the fourth batch.

In some possible embodiments, step 362 specifically includes: The second batch scheduling module performs group batching on the fifth request based on the second computing resource status and the second condition, to obtain the fourth batch.

For example, the second computing resource status includes a quantity of idle resources in the third device.

For example, the second condition includes a maximum quantity of batches grouped by the third device.

For example, the fourth batch includes a plurality of requests.

For example, the second batch scheduling module groups at least one request that arrives at a same moment into one batch. In the decoding phase, an input length of each request is 1. Provided that there is an idle position in the current batch, a token whose length is 1 can be placed in the batch for inference.

Step 364: The second computing resource module performs second inference computing on the fourth batch based on the third cache information, to obtain a sixth request and fourth cache information.

In this step, as shown in FIG. 3, the second execution engine of the second computing resource module performs second inference computing on the fourth batch based on the third cache information, to obtain the sixth request and the fourth cache information.

In some possible embodiments, step 364 specifically includes: The second execution engine of the second computing resource module performs second inference computing on the fourth batch in the second processing manner based on the third cache information, to obtain the sixth request and the fourth cache information of the second service.

For example, the sixth request includes the identifier of the second service and fourth output information corresponding to the second service, and the sixth request is associated with the fifth request.

For example, the fourth cache information is cache information required when the third device performs inference computing on the sixth request.

For example, the second inference computing is inference computing in the decoding phase, namely, decode computing.

For example, in the second processing manner, if there is a target request whose output information meets the specified condition in a current batch inference process, a computing service resource of the target request is released, and a request in a next batch is inserted into the idle computing service resource to perform second inference computing.

Step 366: The second computing resource module sends the fourth cache information to the second storage module.

In this step, as shown in FIG. 3, the second execution engine of the second computing resource module sends the fourth cache information to the second storage module.

Step 368: The second computing resource module sends the sixth request to the service scheduling module. Step 370 or step 372 continues to be performed.

In this step, as shown in FIG. 3, the second execution engine of the second computing resource module sends the sixth request to the service scheduling module.

For example, the sixth request is a request for the second service returned by the third device.

Step 370: When the fourth output information meets the specified condition, the service scheduling module sends the fourth output information to the LLM service module. The LLM service module sends the fourth output information to the second user, and a process ends.

In this step, as shown in FIG. 3, when the fourth output information meets the specified condition, the service scheduling module sends the fourth output information to the LLM service module. The LLM service module sends the fourth output information to the second user, and a process ends.

Step 372: When the fourth output information does not meet the specified condition, the service scheduling module schedules the sixth request to the second inference component package.

Based on the system architecture shown in FIG. 3, an embodiment of the present invention provides a request scheduling method. FIG. 7A and FIG. 7B are a flowchart of a request scheduling method according to an embodiment of the present invention. As shown in FIG. 7A and FIG. 7B, the method includes the following steps.

Step 402: A first device receives a first request from a first user, where the first request is a request for a first service, and the first request includes an identifier of the first service.

For example, the identifier includes a service ID.

For example, the first request does not include requests returned by the second device and the third device. In other words, the first request is a request for a new service.

Step 404: The first device schedules the first request to the second device.

The first device schedules a newly arrived service request to a prefill inference execution container, namely, the second device, and establishes a service pool to store a request for a service that waits due to a resource limitation.

Step 406: The second device sends a second request to the first device, where the second request includes the identifier of the first service and first output information corresponding to the first service, and the second request is associated with the first request.

For example, the first output information includes an output token sequence. The first output information is a first output token sequence.

Step 408: The first device schedules the second request to the third device when the first output information does not meet a specified condition, where the third device is different from the second device.

For example, the second request is a request for the first service returned by the second device.

For example, the specified condition includes at least one of the following:

a length of output information is greater than or equal to a first threshold; or output information includes a terminator.

Step 410: The third device sends a third request to the first device, where the third request includes the identifier of the first service and second output information corresponding to the first service, and the third request is associated with the second request.

Step 412: The first device schedules the third request to the third device when the second output information does not meet the specified condition.

For example, the third request is a request for the first service returned by the third device.

The first device sends the third request to the third device, so that the third device continues to perform a next round of decode computing on the third request, and uses, in a next round of decode computing, second cache information generated in a previous round of decode computing. The third device stores cache information generated in the next round of decode computing, for use in a still next round of decode computing.

Optionally, as shown in FIG. 7A and FIG. 7B, between step 404 and step 406, step 4052 to step 4054 are further included.

Step 4052: The second device performs group batching on the first request based on a first computing resource status and a first condition to obtain a first batch.

For example, the first request further includes input information.

For example, the input information includes an input token sequence.

For example, the first computing resource status includes a quantity of idle resources in the second device.

For example, the first condition includes a maximum quantity of requests grouped by the second device in a batch.

In some possible embodiments, step 4052 specifically includes: The second device obtains, based on the first request, the input information corresponding to the first request and a first length of the input information; and performs, based on the first computing resource status, the first condition, and the first length, group batching on the first request and the at least one seventh request that arrives at the second device at the same time as the first request, to obtain the first batch.

The seventh request is a request from the first user, a second user, or another user.

A length of input information corresponding to the seventh request is similar to the first length. This helps reduce a waste of idle resources in a first inference computing process.

Step 4054: The second device performs first inference computing on the first batch to obtain the second request and first cache information.

For example, cache information includes key-value KV cache information. The first cache information is first key-value KV cache information.

In some possible embodiments, step 4052 specifically includes: The second device performs first inference computing on the first batch in the first processing manner.

For example, the first inference computing is inference computing in a prefill phase, namely, prefill computing.

For example, in the first processing manner, after inference computing of all requests in a current batch ends, computing service resources occupied by the current batch are released, and a next batch is inserted into the idle computing service resources to perform first inference computing.

In this embodiment of the present invention, after step 4052, the method further includes: The second device sends the first cache information to the third device.

Optionally, after step 406, the method further includes: The first device sends the first output information to the first user when the first output information meets the specified condition.

Optionally, as shown in FIG. 7A and FIG. 7B, between step 408 and step 410, step 4092 to step 4094 are further included.

Step 4092: The third device performs group batching on the second request based on a second computing resource status and a second condition to obtain a second batch.

For example, the second computing resource status includes a quantity of idle resources in the third device.

For example, the second condition includes a maximum quantity of batches grouped by the third device.

In some possible embodiments, step 4092 specifically includes: performing, based on the second computing resource status and the second condition, group batching on the second request and at least one eighth request that arrives at the third device at the same time as the second request, to obtain the second batch, where the eighth request is from the second device or the third device.

Step 4094: The third device performs second inference computing on the second batch based on the first cache information, to obtain the third request and the second cache information.

For example, the second inference computing is inference computing in the decoding phase, namely, decode computing. In the decoding phase, the input length of each request is 1. Provided that there is an idle position in the current batch, a token whose length is 1 can be placed in the batch for inference.

In some possible embodiments, step 4094 specifically includes: The third device performs second inference computing on the second batch in the second processing manner based on the first cache information, to obtain the third request and the second cache information.

For example, in the second processing manner, if there is a target request whose output information meets the specified condition in the current batch inference process, a computing service resource of the target request is released, and a request in a next batch is inserted into the idle computing service resource to perform second inference computing.

In this embodiment of the present invention, after step 4094, the method further includes: The third device stores the second cache information.

For example, the second cache information is cache information required when the third device performs second inference computing on the third request.

Optionally, as shown in FIG. 7A and FIG. 7B, after step 412, the method further includes step 414 to step 424.

Step 414: The first device receives a fourth request from a second user, where the fourth request is a request for a second service, and the fourth request includes an identifier of the second service.

Step 416: The first device schedules the fourth request to the second device.

Step 418: The second device sends a fifth request to the first device, where the fifth request includes the identifier of the second service and third output information corresponding to the second service, and the fifth request is associated with the fourth request.

Step 420: The first device schedules the fifth request to the third device when the third output information does not meet the specified condition.

Step 422: The third device sends a sixth request to the first device, where the sixth request includes the identifier of the second service and fourth output information corresponding to the second service, and the sixth request is associated with the fifth request.

Step 424: The first device schedules the sixth request to the third device when the fourth output information does not meet the specified condition.

Optionally, between step 416 and step 418, step 4172 to step 4174 are further included.

Step 4172: The second device performs group batching on the fourth requests based on the first computing resource status and the first condition to obtain a third batch.

For example, the fourth request further includes input information.

In some possible embodiments, step 4172 specifically includes: The second device obtains, based on the fourth request, the input information corresponding to the fourth request and a second length of the input information; and performs group batching on the fourth request based on the first computing resource status, the first condition, and the second length, to obtain the third batch.

Step 4174: The second device performs first inference computing on the third batch to obtain a fifth request and third cache information.

In some possible embodiments, step 4172 specifically includes: The second device performs first inference computing on the third batch in the first processing manner.

For example, in the first processing manner, after inference computing of all requests in a current batch ends, computing service resources occupied by the current batch are released, and a next batch is inserted into the idle computing service resources to perform first inference computing.

In this embodiment of the present invention, after step 4172, the method further includes: The second device sends the third cache information to the third device.

Optionally, after step 418, the method further includes: The first device sends the third output information to the first user when the third output information meets the specified condition.

Optionally, between step 420 and step 422, step 4212 to step 4214 are further included.

Step 4212: The third device performs group batching on the fifth request based on a second computing resource status and a second condition to obtain a fourth batch.

Step 4214: The third device performs second inference computing on the fourth batch based on third cache information, to obtain a sixth request and fourth cache information.

In some possible embodiments, step 4214 specifically includes: The third device performs second inference computing on the fourth batch in the second processing manner based on the third cache information, to obtain the sixth request and the fourth cache information.

For example, in the second processing manner, if there is a target request whose output information meets the specified condition in the current batch inference process, a computing service resource of the target request is released, and a request in a next batch is inserted into the idle computing service resource to perform second inference computing.

In this embodiment of the present invention, after step 4094, the method further includes: The third device stores the fourth cache information.

The present invention discloses a request scheduling method and a device. The method includes: A first device receives a first request from a first user, where the first request is a request for a first service, and the first request includes an identifier of the first service; the first device schedules the first request to a second device; the second device sends a second request to the first device, where the second request includes the identifier of the first service and first output information, and the second request is associated with the first request; when the first output information does not meet a specified condition, the first device schedules the second request to a third device, where the third device is different from the second device; the third device sends a third request to the first device, where the third request includes the identifier of the first service and second output information, and the third request is associated with the second request; and when the second output information does not meet the specified condition, the first device schedules the third request to the third device, so that a throughput of a service system in a large-scale language model service deployment can be improved.

Figure 8:
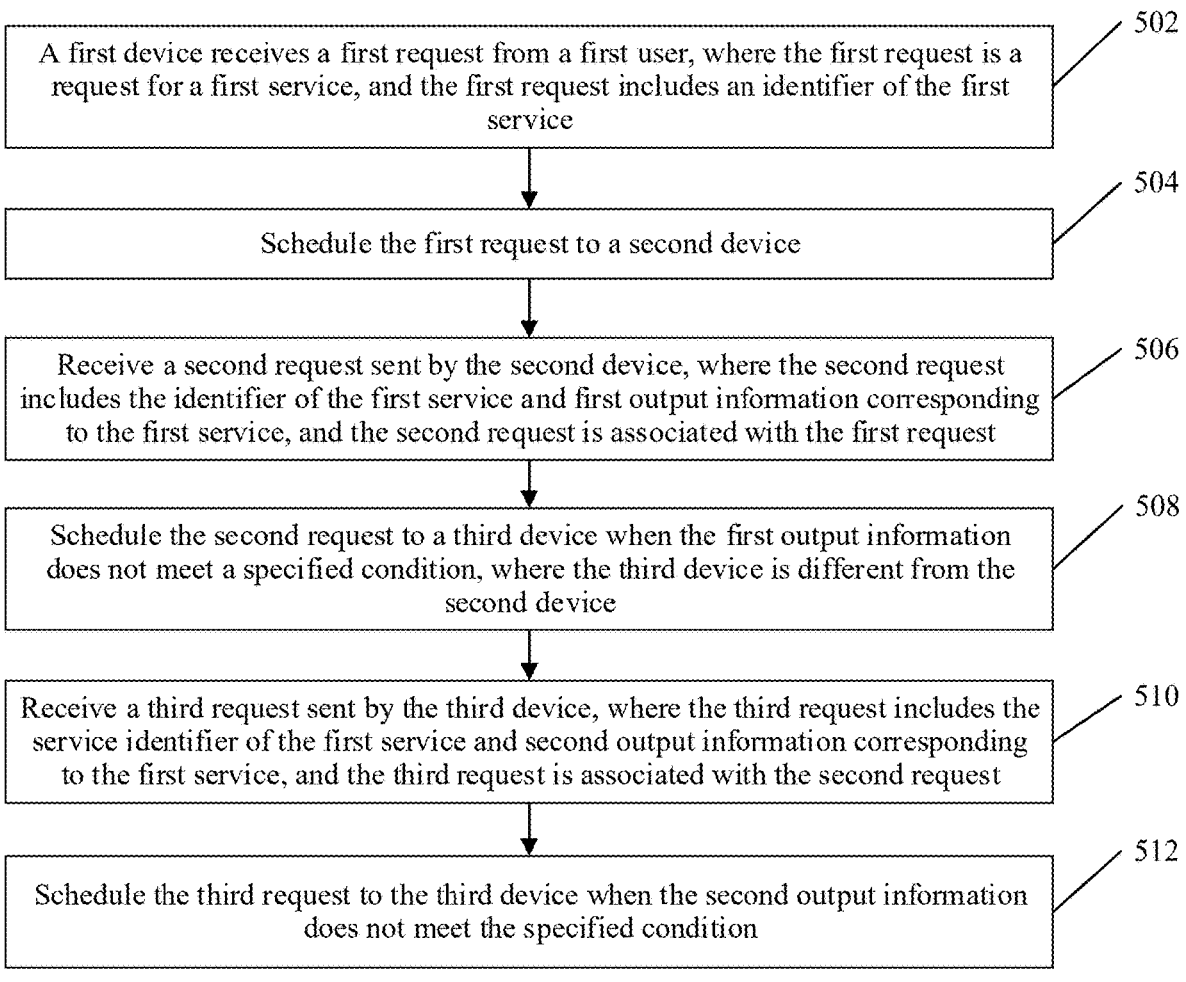
FIG. 8 is a flowchart of another request scheduling method according to an embodiment of the present invention.

Based on the system architecture shown in FIG. 3, an embodiment of the present invention provides a request scheduling method, used in a first device. FIG. 8 is a flowchart of another request scheduling method according to an embodiment of the present invention. As shown in FIG. 8, the method includes the following steps.

Step 502: A first device receives a first request from a first user, where the first request is a request for a first service, and the first request includes an identifier of the first service.

Step 504: Schedule the first request to a second device.

Step 506: Receive a second request sent by the second device, where the second request includes the identifier of the first service and first output information corresponding to the first service, and the second request is associated with the first request.

Step 508: Schedule the second request to a third device when the first output information does not meet a specified condition, where the third device is different from the second device.

Step 510: Receive a third request sent by the third device, where the third request includes the identifier of the first service and second output information corresponding to the first service, and the third request is associated with the second request.

Step 512: Schedule the third request to the third device when the second output information does not meet the specified condition.

In the technical solution of the request scheduling method provided in this embodiment of the present invention, the method includes: The first device receives at least one first request, where the first request is a request for a service; schedules the at least one first request to the second device, where the first request does not include requests returned by the second device and the third device; receives at least one second request returned by the second device, and schedules the at least one second request to the third device; receives at least one third request returned by the third device, determines, based on the third request, whether the third request meets a third condition, and if determining that the third request does not meet the third condition, schedules the third request to the third device, so that a throughput of a service system in a large-scale language model service deployment can be improved.

Figure 9:
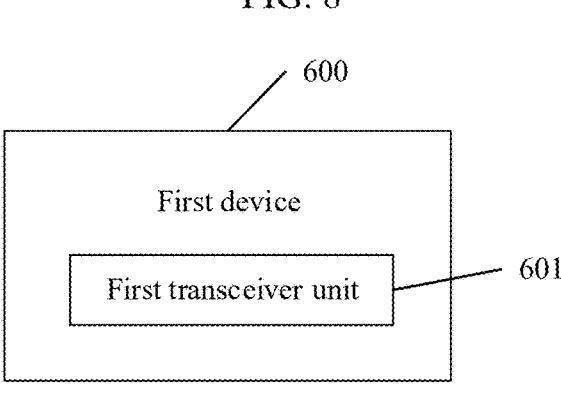
FIG. 9 is a diagram of a structure of a first device according to an embodiment of the present invention.

FIG. 9 is a diagram of a structure of a first device according to an embodiment of the present invention. It should be understood that the first device 600 can perform the steps of the first device in the foregoing request scheduling method. To avoid repetition, details are not described herein again. The first device 600 includes a first transceiver unit 601.

The first transceiver unit 601 is configured to: receive a first request from a first user, where the first request is a request for a first service, and the first request includes an identifier of the first service; schedule the first request to a second device; receive a second request sent by the second device, where the second request includes the identifier of the first service and first output information corresponding to the first service, and the second request is associated with the first request; schedule the second request to a third device when the first output information does not meet a specified condition, where the third device is different from the second device; receive a third request sent by the third device, where the third request includes the identifier of the first service and second output information corresponding to the first service, and the third request is associated with the second request; and when the second output information does not meet the specified condition, schedule the third request to the third device.

Optionally, the first transceiver unit 601 is further configured to: receive a fourth request from a second user, where the fourth request is a request for a second service, and the fourth request includes an identifier of the second service; schedule the fourth request to the second device; receive a fifth request sent by the second device, where the fifth request includes the identifier of the second service and third output information corresponding to the second service, and the fifth request is associated with the fourth request; schedule the fifth request to the third device when the third output information does not meet the specified condition; receive a sixth request sent by the third device, where the sixth request includes the identifier of the second service and fourth output information corresponding to the second service, and the sixth request is associated with the fifth request; and schedule the sixth request to the third device when the fourth output information does not meet the specified condition.

Optionally, the first transceiver unit 601 is further configured to: when the second output information meets the specified condition, send the second output information to the first user.

Optionally, the identifier includes a service ID.

Optionally, the specified condition includes at least one of the following:

a length of output information is greater than or equal to a first threshold; or the output information includes a terminator.

FIG. 10 is a diagram of a structure of a second device according to an embodiment of the present invention. It should be understood that the second device 700 can perform steps of the second device in the foregoing request scheduling method. To avoid repetition, details are not described herein again. The second device 700 includes a second transceiver unit 701 and a second processing unit 702.

The second transceiver unit 701 is configured to receive a first request sent by a first device from a first user, where the first request is a request for a first service, and the first request includes an identifier of the first service; and send a second request to the first device, where the second request includes an identifier of the first service and first output information corresponding to the first service, and the second request is associated with the first request.

Optionally, the second transceiver unit 701 is further configured to receive a fourth request sent by the first device from a second user, where the fourth request is a request for a second service, and the fourth request includes an identifier of the second service; and send a fifth request to the first device, where the fifth request includes the identifier of the second service and third output information corresponding to the second service, and the fifth request is associated with the fourth request.

Optionally, before the second transceiver unit 701 sends the second request to the first device, the second processing unit 702 is configured to perform, based on a first computing resource status and a first condition, group batching on the first request and at least one seventh request that arrives at the second device at the same time as the first request, to obtain a first batch, where the seventh request is a request from the first user, the second user, or another user; and perform first inference computing on the first batch to obtain the second request and first cache information.

Optionally, the second transceiver unit 701 is further configured to send the first cache information to a third device.

Optionally, the cache information includes key-value KV cache information.

Optionally, the second processing unit 702 is specifically configured to obtain, based on the first request, input information corresponding to the first request and a first length of the input information; and perform, based on the first computing resource status, the first condition, and the first length, group batching on the first request and the at least one seventh request that arrives at the second device at the same time as the first request, to obtain the first batch.

FIG. 11 is a diagram of a structure of a third device according to an embodiment of the present invention. It should be understood that the third device 800 can perform steps of the third device in the foregoing request scheduling method. To avoid repetition, details are not described herein again. The third device 800 includes a third transceiver unit 801 and a third processing unit 802.

The third transceiver unit 801 is configured to receive a second request sent by a first device from a second device, where the second request includes an identifier of a first service and first output information corresponding to the first service, the second request is associated with the first request, and the first request is a request for the first service from a first user; and send a third request to the first device, where the third request includes the identifier of the first service and second output information corresponding to the first service, and the third request is associated with the second request.

Optionally, the third transceiver unit 801 is further configured to receive a fifth request sent by the first device from the second device, where the fifth request includes an identifier of a second service and third output information corresponding to the second service, the fifth request is associated with a fourth request, and the fourth request is a request for the second service from a second user; and send a sixth request to the first device, where the sixth request includes the identifier of the second service and fourth output information corresponding to the second service, and the sixth request is associated with the fifth request.

Optionally, before the third transceiver unit 801 sends the third request to the first device, the third processing unit 802 is configured to perform, based on a second computing resource status and a second condition, group batching on the second request and at least one eighth request that arrives at the third device at the same time as the second request, to obtain a second batch, where the eighth request is from the second device or the third device.

The third transceiver unit 801 is further configured to receive first cache information sent by the second device.

The third processing unit 802 is further configured to perform second inference computing on the second batch based on the first cache information, to obtain the third request and second cache information.

It should be understood that the first device 600, the second device 700, and the third device 800 herein are embodied in a form of functional units. The term "unit" herein may be implemented in a form of software and/or hardware. This is not specifically limited. For example, the "unit" may be a software program, a hardware circuit, or a combination thereof that implements the foregoing function. The hardware circuit may include an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

Therefore, the units in the examples described in embodiments of the present invention can be implemented by using electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

An embodiment of this application provides a device. The device may be a terminal device or a circuit device built into the terminal device. The device may be configured to perform functions/steps in the foregoing method embodiments.

An embodiment of this application provides a readable storage medium. The readable storage medium stores instructions. When the instructions are run on a device or a processor, the device is enabled to perform the functions/steps in the foregoing method embodiments.

An embodiment of this application further provides a program product including instructions. When the program product runs on a device or at least one processor, the device is enabled to perform the functions/steps in the foregoing method embodiments.

In embodiments of this application, "at least one" refers to one or more, and "a plurality of" refers to two or more. For example, A and/or B may represent the following three cases: Only A exists, both A and B exist, and only B exists. A and B may be singular or plural. The character "/" generally indicates an "or" relationship between the associated objects. "At least one of the following" and similar expressions refer to any combination of these terms, including any combination of single or plural terms. For example, at least one of a, b, and c may represent: a, b, c, a-b, a-c, b-c, or a-b-c, where a, b, and c may be one or more.

A person of ordinary skill in the art may be aware that the units and algorithm steps described in the embodiments disclosed in this specification can be implemented by a combination of electronic hardware, computer software, and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, when any function is implemented in a form of a software functional unit and sold or used as an independent product, the function may be stored on a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for indicating a device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of embodiments of this application. Any variation or replacement readily figured out by a person skilled in the art within the technical scope disclosed in this application shall fall within the protection scope in embodiments of this application. Therefore, the protection scope of this application shall be subject to the protection scope of the claims.

What is claimed is:

1. A method for inference of large-scale language models, the method comprising:

receiving a first request of a user, wherein the first request is a request for a first service;

sending the first request to a first electronic device, wherein the first electronic device is configured to perform a first inference calculation in a first processing manner in a prefill phase;

receiving a second request from the first electronic device, wherein the second request comprises first output information corresponding to the first service, and the first output information comprises a token output for the first request generated by the first electronic device through the first inference calculation;

in response to the first output information meeting a specified condition, ending scheduling of the first service; and in response to the first output information not meeting the specified condition, sending the second request to a second electronic device, and receiving a third request from the second electronic device, wherein the second electronic device is different from the first electronic device, the second electronic device is configured to perform a second inference calculation in a second processing manner in a decode phase, and the third request comprises second output information corresponding to the first service, and the second output information comprises a token output for the second request generated by the second electronic device through the second inference calculation;

in response to the second output information meeting the specified condition, ending the scheduling of the first service; and in response to the second output information not meeting the specified condition, sending the third request to the second electronic device.

2. The method according to claim 1, wherein the specified condition comprises at least one of:

a length of output information is greater than or equal to a first threshold; or the output information comprises a terminator.

3. The method of claim 1, wherein the first inference calculation comprises processing M1 services in parallel, the M1 services include the first service, M1 is a positive integer, and the method further comprises:

in response to the first inference calculation of the M1 services in a current round being completed, releasing an occupancy of computing service resources of the first electronic device by the M1 services.

4. The method of claim 3, further comprising, after releasing the occupancy of computing service resources of the first electronic device by the M1 services:

inserting M2 services into idle computing service resources of the first electronic device to perform a next round of the first inference calculation, wherein M2 is a positive integer.

5. The method of claim 3, wherein M1 equals 1, the M1 services consist solely of the first service, and processing M1 services in parallel comprises processing only the first service.

6. The method of claim 1, wherein the second inference calculation comprises processing N1 services in parallel, the N1 services include the first service, N1 is a positive integer, and in response to the first output information not meeting the specified condition, the method further comprises:

in response to output information corresponding to the first service in the calculation results of the second inference calculation for N1 services meeting the specified condition, releasing an occupancy of computing service resources of the second electronic device by the first service.

7. The method of claim 6, further comprising, after releasing the occupancy of computing service resources of the second electronic device by the first service:

inserting a second service into idle computing service resources of the second electronic device to perform the second inference calculation for N2 services, wherein N2 is a positive integer, wherein the N1 services do not include the second service, and the N2 services include the second service and do not include the first service.

8. The method of claim 7, wherein both N1 and N2 are greater than each of M1 and M2.

9. The method according to claim 7, wherein an intersection of the N1 services and the N2 services is non-empty.

10. The method according to claim 1, wherein the first processing manner comprises:

after the inference calculation of all services in a current round has been completed, releasing computing service resources occupied by the current round and inserting a next round of at least one service into idle computing service resources to perform the first inference calculation; and the second processing manner comprises:

during an inference process of the current round, if there is a target request whose output information meets the specified condition, releasing the computing service resources of the target request and inserting a service of a next round into the idle computing service resources to perform the second inference calculation.

11. The method according to claim 1, further comprising: transmitting first cache information generated through the first inference calculation to the second electronic device, wherein the first cache information is used by the second electronic device to perform the second inference calculation.

12. The method according to claim 1, further comprising: storing second cache information generated through the second inference calculation in the second electronic device, wherein the second cache information is used by the second electronic device to perform the second inference calculation in a next round.

13. The method according to claim 1, further comprising, after sending the third request to the second electronic device:

receiving a fourth request from the second electronic device, wherein the fourth request comprises third output information corresponding to the first service, the third output information comprises a token output for the third request, and the token output for the third request is generated by the second electronic device through the second inference calculation.

14. The method according to claim 1, wherein the first electronic device is a computing card, and the second electronic device is a computing card.

15. A model inference system, comprising at least one first electronic device, at least one second electronic device, and a scheduling apparatus, wherein:

the first electronic device is configured to perform a first inference calculation in a prefill phase in a first processing manner;

the second electronic device is configured to perform a second inference calculation in a decode phase in a second processing manner; and the scheduling apparatus is configured to:

receive a first request of a user, wherein the first request is a request for a first service, send the first request to the first electronic device, receive a second request from the first electronic device, wherein the second request comprises first output information corresponding to the first service, and the first output information comprises a token output for the first request generated by the first electronic device through the first inference calculation, in response to the first output information meeting a specified condition, end the scheduling of the first service, and in response to the first output information not meeting the specified condition, send the second request to the second electronic device, and receive a third request from the second electronic device, wherein the third request comprises second output information corresponding to the first service, and the second output information comprises a token output for the second request generated by the second electronic device through the second inference calculation, in response to the second output information meeting a specified condition, end the scheduling of the first service, and in response to the second output information not meeting the specified condition, send the third request to the second electronic device.

16. The model inference system according to claim 15, wherein the at least one first electronic device and the at least one second electronic device are deployed in an independent separate deployment manner.

17. The model inference system according to claim 15, wherein:

the first processing manner comprises:

after the inference calculation of all services in a current round has been completed, releasing computing service resources occupied by the current round and inserting a next round of at least one service into idle computing service resources to perform the first inference calculation; and the second processing manner comprises:

during an inference process of the current round, if there is a target request whose output information meets the specified condition, releasing the computing service resources of the target request and inserting a service of the next round into the idle computing service resources to perform the second inference calculation.

18. The model inference system according to claim 15, wherein the specified condition comprises at least one of:

a length of output information is greater than or equal to a first threshold; or the output information comprises a terminator.

19. The model inference system according to claim 15, wherein:

the second electronic device is configured to receive first cache information generated through the first inference calculation, wherein the first cache information is used by the second electronic device to perform the second inference calculation; and the second electronic device is configured to store second cache information generated through the second inference calculation, wherein the second cache information is used by the second electronic device to perform the second inference calculation in a next round.

20. The model inference system according to claim 15, wherein the first electronic device is a computing card, and the second electronic device is a computing card.

* * * * *